(12) United States Patent
Takazawa et al.

(10) Patent No.: US 8,174,941 B2
(45) Date of Patent: May 8, 2012

(54) OPTICAL DISC APPARATUS, CROSSTALK CORRECTION METHOD AND INTEGRATED CIRCUIT

(75) Inventors: Minoru Takazawa, Osaka (JP);
Shin-ichi Yamada, Osaka (JP);
Takeharu Yamamoto, Osaka (JP);
Yasuo Ooishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 806 days.

(21) Appl. No.: 12/097,739

(22) PCT Filed: Dec. 13, 2006

(86) PCT No.: PCT/JP2006/324863
§ 371 (c)(1),
(2), (4) Date: Jun. 16, 2008

(87) PCT Pub. No.: WO2007/069655
PCT Pub. Date: Jun. 21, 2007

(65) Prior Publication Data
US 2009/0046549 A1    Feb. 19, 2009

(30) Foreign Application Priority Data

Dec. 15, 2005   (JP) ................................. 2005-361573

(51) Int. Cl.
*G11B 7/00* (2006.01)
(52) U.S. Cl. ............... 369/44.32; 369/44.28; 369/44.29; 369/44.35; 369/44.36
(58) Field of Classification Search ............... 369/44.26, 369/44.28, 44.29, 44.32, 44.35, 44.36
See application file for complete search history.

(56) References Cited

U.S. PATENT DOCUMENTS

| 5,199,011 A | * | 3/1993 | McDonald et al. | ........ 369/44.29 |
| 5,768,227 A | * | 6/1998 | Baba | .......................... 369/44.28 |
| 5,999,502 A | | 12/1999 | Nakata et al. | |

(Continued)

FOREIGN PATENT DOCUMENTS

JP    7-169070    7/1995

(Continued)

OTHER PUBLICATIONS

International Search Report issued May 29, 2007 in the International (PCT) Application No. PCT/JP2006/324863.

*Primary Examiner* — Wayne Young
*Assistant Examiner* — Brenda Bernardi
(74) *Attorney, Agent, or Firm* — Wenderoth, Lind & Ponack, L.L.P.

(57) ABSTRACT

When a focus error signal (FE signal) is detected with an astigmatic method, a track crossing component leaks into the FE signal. Another detection method for the FE signal would reduce the leaking signal, but is not applicable when the light use efficiency decreases. An optical crosstalk correction amount determination unit (1000) determines a correction amount to correct an output of a tracking error detection unit (120) based on optical crosstalk from a TE signal to an FE signal occurring in reflection light from an optical disc (102) when a spot crosses a track. An output of the tracking error detection unit (120) is multiplied by the determined correction amount, and added to an output of the focus error detection unit (118). A focus control unit (138) executes focus control based on the addition result. This effectively reduces a TE signal component that leaks into the FE signal due to optical crosstalk.

26 Claims, 26 Drawing Sheets

U.S. PATENT DOCUMENTS

| | | | |
|---|---|---|---|
| 6,958,957 B2 * | 10/2005 | Kadlec et al. | 369/44.32 |
| 7,551,529 B2 * | 6/2009 | Mitsuda | 369/44.35 |
| 2004/0165493 A1 * | 8/2004 | Fukui | 369/44.32 |
| 2009/0262610 A1 * | 10/2009 | Ho et al. | 369/44.29 |

FOREIGN PATENT DOCUMENTS

| | | |
|---|---|---|
| JP | 8-180429 | 7/1996 |
| JP | 11-243366 | 9/1999 |
| JP | 2001-67682 | 3/2001 |
| JP | 2004-227694 | 8/2004 |

* cited by examiner

Output of disturbance
generator 144

Output of tracking error
detection unit 120

Output of focus error
detection unit 180

OPTICAL DISC APPARATUS, CROSSTALK CORRECTION METHOD AND INTEGRATED CIRCUIT

TECHNICAL FIELD

The present invention relates to an optical disc apparatus for correcting a tracking error signal component that leaks into a focus error signal when a light spot crosses a track and thereby reducing power consumption and improving focus control stability, a crosstalk correction method, and an integrated circuit.

BACKGROUND ART

A DVD-ROM (digital versatile disc read-only memory), a DVD-RAM (digital versatile disc random access memory), a DVD±R (digital versatile disc plus/minus recordable), and a DVD±RW (digital versatile disc plus/minus rewritable) are high-density large-capacity recording media that have been developed in recent years. Other optical discs, such as a blu-ray disc, have been developed as recording media with even larger capacity to record large volumes of data including high-definition videos.

An optical disc apparatus may have optical crosstalk, which is the phenomenon in which a track crossing signal (a tracking error signal (hereafter may be referred to as a "TE signal")) leaks into a focus error signal (hereafter may be referred to as an "FE signal") when a light spot focused on an optical disc crosses a track. When the optical crosstalk occurs, the light spot fluctuates. The light spot may defocus when the light spot fluctuates greatly.

One method often used in the optical disc apparatus to detect a focus error signal is an astigmatic method. With the astigmatic method, the light receiving surface of a light receiving element is divided in four light receiving surfaces, light intensity signals corresponding to each pair of light receiving surfaces that are arranged diagonally are added to obtain a sum signal corresponding to each pair of light receiving surfaces (obtain two sum signals corresponding to the two pairs of light receiving surfaces), and a focus error signal is detected based on a difference between the two sum signals.

When, for example, the optical disc apparatus using the astigmatic method includes the light receiving element that is mounted off the optical axis in the direction tangent to a track of the optical disc, track crossing components (optical crosstalk) leak into the two sum signals by different amounts. In this case, the track crossing components leaking into the two additional signals do not cancel out. As a result, the focus error signal will have a track crossing component. If the track crossing component of the focus error signal is large, the light spot of the optical apparatus may defocus. To prevent defocusing, the optical crosstalk needs to be corrected.

A conventional optical disc apparatus corrects optical crosstalk while tracking control is off, such as while seeks are being performed. Such a method of correcting optical crosstalk will now be described with reference to FIG. 29. FIG. 29 shows the structure of a conventional optical disc apparatus 600. The optical disc apparatus 600 mainly includes an optical head (mainly composed of a light source 104, a coupling lens 106, a polarization beam splitter 108, a polarization plate 110, a converging lens 112, a focusing lens 114, and a light receiving element 116), a focus error detection unit 2901, a focus control unit 2902, a vertical movement unit 140, a tracking error detection unit 2904, a tracking control unit 2905, a horizontal movement unit 142, and an optical crosstalk correction unit 2911. The optical head reads information from an optical disc 102 or records information onto the optical disc 102.

In FIG. 29, the focus error detection unit 2901 detects a focus error signal based on reflection light from an optical disc through the light receiving element 116, and outputs the focus error signal. The focus control unit 2902 generates a control signal that enables the light spot to focus on the optical disc in a substantially uniform state based on an output of the focus error detection unit 2901. The focus control unit 2902 drives the vertical movement unit 140 based on the control signal to execute focus control. The tracking error detection unit 2904 detects a tracking error signal based on reflection light from the optical disc through the light receiving element 116, and outputs the tracking error signal. The tracking control unit 2905 generates a control signal that enables the light spot to be within a substantially uniform range from the center of a track of the optical disc based on an output of the tracking error detection unit 2904. The tracking control unit 2905 drives the horizontal movement unit 142 based on the control signal to execute tracking control. When the light spot crosses a track, optical crosstalk occurs from a path linking the light receiving element 116 and the tracking error detection unit 2904 to a path linking the light receiving element 116 and the focus error detection unit 2901. In FIG. 29, a box 2910 indicates a circuit portion equivalent to the state of such optical crosstalk. Due to the optical crosstalk, a signal component of a tracking error signal corresponding to the optical crosstalk (optical leaking signal component) leaks from the tracking error signal into a focus error signal.

The optical crosstalk correction unit 2911 includes a coefficient multiplier 2908 and an adder 2912. To reduce the optical leaking signal component generated by the optical crosstalk, the optical crosstalk correction unit 2911 electrically corrects the focus error signal output from the focus error detection unit 2901. The coefficient multiplier 2908 receives the tracking error signal, multiplies the tracking error signal by a gain value that would reduce the optical leaking signal component generated by the optical crosstalk, and outputs the resulting signal to the adder 2912. The adder 2912 adds the output from the focus error detection unit 2901 and the output from the coefficient multiplier 2908 to obtain a focus error signal with a reduced optical leaking signal component generated by the optical crosstalk. The adder 2912 outputs the focus error signal with the reduced optical leaking signal to the focus control unit 2902.

In this manner, the optical disc apparatus 600 executes focus control while reducing undesired effects of optical crosstalk.

One technique of correcting a focus error signal known in the art is to calculate an amount of a tracking error signal that leaks into a focus error signal while the tracking control is off, and subtract a tracking error signal with a level adjusted according to the calculated leaking amount from the focus error signal while seeks are being performed (see, for example, Patent Citation 1).

Another technique of correcting a focus error signal known in the art is to use a different focus offset amount depending on whether the focus error signal corresponds to a land or a groove (see, for example, Patent Citation 2).

Still another technique of correcting a focus error signal known in the art is to use a differential astigmatic method instead of the astigmatic method. With the differential astigmatic method, the light receiving surface of a light receiving element is divided in four light receiving surfaces, a first focus error signal involving optical crosstalk (a focus error signal obtained with a first beam) and a second focus error signal involving optical crosstalk whose phase is opposite to the phase of the optical crosstalk of the first focus error signal (a sum signal of a focus error signal obtained with a second beam and a focus error signal obtained with a third beam) are obtained, and the first focus error signal and the second focus error signal are added to reduce optical crosstalk. In this manner, the optical leaking signal component generated by optical crosstalk is prevented from leaking into the focus error signal.

Patent Citation 1: Japanese Unexamined Patent Publication No. 2001-67682 (p2)

Patent Citation 2: Japanese Unexamined Patent Publication No. H8-180429

DISCLOSURE OF INVENTION

Technical Problem

However, the techniques described above are intended for correcting optical crosstalk while the tracking control is off. If the light spot is off a track due to wobble elements of the track or the like and optical crosstalk occurs in a focus error signal while the tracking control is on, the above techniques fail to correct optical crosstalk in an appropriate manner. As a result, the optical disc apparatus increases power consumption and causes focus control instability.

The techniques described above fail to consider differences in optical crosstalk among tracking error signals caused by different modulation depths of the signals. When, for example, the optical disc apparatus performs recording or readout onto or from at least one of a land and a groove, the apparatus cannot correct optical crosstalk in an appropriate manner. As a result, the optical disc apparatus increases power consumption and causes focus control instability.

The techniques described above fail to consider differences in optical crosstalk amounts among tracking error signals corresponding to two or more recordable and readable layers of an optical disc caused by different modulation depths of the signals. With the same correction value used to correct optical crosstalk in all layers of the optical disc, the optical disc apparatus cannot correct optical crosstalk in an appropriate manner. As a result, the optical disc apparatus increases power consumption and causes focus control instability.

The techniques described above fail to correct optical crosstalk in an appropriate manner when, for example, the contrast of a focus error signal detected by the light receiving element changes and a tracking error signal component that leaks into a focus error signal changes according to the change in the focus error signal while information is being read from the optical disc or recorded onto the optical disc. This may occur when, for example, the offset amount, the spherical aberration amount, or the radial tilt amount of the focus errors signal changes. As a result, the optical disc apparatus increases power consumption and causes focus control instability.

Moreover, when mechanical crosstalk occurs from the focus control driving system to the tracking control driving system (a box 3001 in FIG. 30 indicates a circuit portion equivalent to the state of such crosstalk), a minor loop to the focus control system is formed as indicated by an arrow R3003 in FIG. 30. As a result, the focus control system will have operation instability.

When, for example, the optical disc apparatus with the techniques described above uses a blue laser as its laser light source, the optical disc apparatus fails to increase the output power of the blue laser to a required laser power. In this case, the optical disc apparatus is required to increase the light use efficiency of its optical head. The optical disc apparatus using a blue laser as its laser light source may fail to reduce undesired effects of optical crosstalk with the detection method using split light, such as with the differential astigmatic method.

Moreover, the techniques described above determine the gain value used for correction based on the amplitude of an FE signal while the tracking control is off, multiply the TE signal by the gain value, and add the resulting TE signal to the FE signal to correct a TE signal component that leaks into the FE signal due to optical crosstalk. The above techniques are intended for correcting the TE signal component leaking into the FE signal due to optical crosstalk while the tracking control is on using the same gain value as determined while the tracking control is off. In this case, the optical disc apparatus fails to correct optical crosstalk in an optimum manner while the tracking control is on.

The optical crosstalk correction performed in this case will be described with reference to FIGS. 29 and 31. FIG. 31A shows one example of the waveform of a TE signal. FIG. 31B shows one example of the waveform of a TE signal component that leaks into the FE signal. In both FIGS. 31A and 31B, the horizontal axis indicates time (where the variable of the horizontal axis is θ, which is an angle corresponding to time), and the vertical axis indicates the amplitude of the signal. FIG. 31A shows the waveform of a tracking error signal A*sin θ. FIG. 31B shows the waveform of a tracking error signal component B*sin(θ+α) that leaks into the focus error signal. The coefficient multiplier shown in FIG. 29 is assumed to have a gain G. The optical crosstalk correction in this case will now be described.

The gain value G for adjusting (correcting) the signal level while the tracking control is off is calculated to minimize the amplitude of a signal B*sin(θ+α)+G*A*sin θ, which is obtained by adding an output G*A*sin θ of the coefficient multiplier 2908 and a signal component B*sin(θ+α) that has leaked into the FE signal due to optical crosstalk (hereafter referred to as a "sum signal"). The sum signal f(θ) is written as formula 1.

$$f(\theta) = B\sin(\theta + \alpha) + GA\sin\theta \qquad \text{Formula 1}$$
$$= (B\cos\alpha + GA)\sin\theta + B\sin\alpha\cos\theta$$

Based on formula 1, the amplitude Amp of the sum signal is written as formula 2.

$$\text{Amp} = \sqrt{(B\cos\alpha + GA)^2 + (B\sin\alpha)^2} \qquad \text{Formula 2}$$
$$\sqrt{A^2(G + B\cos\alpha/A)^2 + B^2(1 - \cos^2\alpha)}$$

Based on formula 2, the gain value G that minimizes the amplitude value Amp of the sum signal is written as formula 3.

$$G = -B\cos\alpha/A \qquad \text{Formula 3}$$

The gain value G calculated using formula 3 is set in the coefficient multiplier 2908. In this case, a signal component of the TE signal that leaks into the FE signal is reduced effectively while the tracking control is off. As a result, the optical disc apparatus reduces undesired effects of optical crosstalk.

However, while the tracking control is on in the optical disc apparatus, the behavior of an FE signal in the vicinity of the on-track point is important. More specifically, with the optical correction amount G calculated to cause the amplitude of the FE signal and the amplitude of the TE signal to have the same gradient, the optical crosstalk is corrected in an optimum manner. The gain value G for adjusting (correcting) the signal level while the tracking control is on is calculated to minimize the differential value of the value θ of the sum signal (B*sin(θ+α)+G*A*sin θ), which is obtained by adding the differential value (gradient) of the value θ of the output G*A*sin θ of the coefficient multiplier 2908 and the differential value (gradient) of the value θ of the signal component B*sin(θ+α), which has leaked into the FE signal due to optical crosstalk. The differential value f'(θ) of the sum signal is written as formula 4.

$$f'(\theta) = \frac{d}{d\theta}\{B\sin(\theta+\alpha) + GA\sin\theta\} \qquad \text{Formula 4}$$

The gain value G that causes the value f'(θ) to be zero is calculated by substituting zero into the value f'(θ) as in formula 5.

$$f'(\theta) = \frac{d}{d\theta}\{B\sin(\theta+\alpha) + GA\sin\theta\} = 0 \qquad \text{Formula 5}$$
$$\frac{d}{d\theta}B\sin(\theta+\alpha) = \frac{d}{d\theta}(-GA\sin\theta)$$
$$G = -B(\cos\alpha - \sin\alpha\tan\theta)/A$$

Formula 5 includes two terms that are not included in formula 3. Thus, the gain value G calculated with formula 5 corresponding to the on-track point (in the vicinity of 0) has a higher precision than the gain value G calculated with formula 3.

The gain value G calculated with formula 5 is set in the coefficient multiplier 2908. In this case, a signal component of the TE signal that leaks into the FE signal is reduced effectively while the tracking control is on. As a result, the optical disc apparatus efficiently reduces undesired effects of optical crosstalk occurring particularly in the vicinity of the on-track point while the tracking control is on.

As formulas 3 and 5 show, when the FE signal and the leaking component of the TE signal are at the same phase (α=0), an optimum correction amount used while the tracking control is on and an optimum correction amount used while the tracking control is off coincide with each other, that is, G=−B/A. However, when the FE signal and the leaking component of the TE signal are not at the same phase, optical crosstalk cannot be corrected in an optimum manner while the tracking control is on if the same correction amount is used to correct optical crosstalk while the tracking control is on and while the tracking control is off. In this case, the optical disc apparatus increases power consumption and causes focus control instability.

Further, when the land and the groove have different track duty ratios, tracking error signals corresponding to different tracks have different gradients. When the polarity of the track needs to be switched, the optical crosstalk correction value needs to be adjusted separately for the land and for the groove. Without this adjustment, the optical disc apparatus increases power consumption and reduces focus control instability.

Further, the above techniques correct a focus error signal in the same manner for multiple layers of the optical disc even when the disc has the multiple layers. The layers of the optical disc may vary in their track pitch due to manufacturing variations. To correct crosstalk in an optimum manner, the correction amount needs to be adjusted according to each different layer. However, the above techniques fail to involve such adjustment of the correction amount. As a result, the optical disc apparatus increases power consumption and causes focus control instability.

The above techniques further fail to perform adjustment according to the offset amount of the focus error signal, the spherical aberration amount of the laser, or the tilt amount of the head. Therefore, the above techniques fail to perform optimum correction. As a result, the optical disc apparatus increases power consumption and causes focus control instability.

To solve the above problems, it is an object of the present invention to reduce power consumption of an optical disc apparatus and improves focus control stability both while the tracking control is off and while the tracking control is on.

It is another object of the present invention to provide a crosstalk correction method and an integrated circuit used in the optical disc apparatus.

Technical Solution

A first aspect of the present invention provides an optical disc apparatus that records and reads information onto and from an optical disc having a track including a land and a groove. The apparatus includes a focus error detection unit, a tracking error detection unit, an optical crosstalk correction amount determination unit, a multiplier, an adder, a focus control unit, and a tracking control unit. The focus error detection unit detects a focus error signal based on reflection light from a spot of light focused on the optical disc and outputs the focus error signal. The tracking error detection unit detects a tracking error signal based on the reflection light and outputs the tracking error signal. The optical crosstalk correction amount determination unit determines a correction amount used to correct an output of the tracking error detection unit based on optical crosstalk from the tracking error signal to the focus error signal occurring in reflection light from the optical disc when the spot crosses the track. The multiplier multiplies an output of the tracking error detection unit by the correction amount determined by the optical crosstalk correction amount determination unit. The adder adds an output of the focus error detection unit and an output of the multiplier. The focus control unit controls focus of the spot based on an output of the adder. The tracking control unit executes tracking control based on an output of the tracking error detection unit.

In this optical disc apparatus, the optical crosstalk correction amount determination unit determines a correction amount used to correct an output of the tracking error detection unit based on optical crosstalk from a TE signal to an FE signal occurring in reflection light from the optical disc when the spot crosses a track. An output of the tracking error detection unit is multiplied by the determined correction amount, and the result is added to an output of the focus error detection unit. The focus control unit then executes focus control based on the addition result. This structure effectively reduces a TE signal component that leaks into an FE signal due to optical crosstalk. As a result, the optical disc apparatus improves focus control stability and reduces power consumption.

A second aspect of the present invention provides the optical disc apparatus of the first aspect of the present invention in which the optical crosstalk correction amount determination unit determines the correction amount used to correct the output of the tracking error detection unit based on a differential value of a signal component of the tracking error signal that leaks into the focus error signal.

In this optical disc apparatus, the optical crosstalk correction amount determination unit determines the correction amount used to correct the output of the tracking error detection unit based on a differential value of a signal component of the tracking error signal that leaks into the focus error signal. Thus, optical crosstalk is corrected with high precision even when the amplitude of a signal component of a TE signal that leaks into an FE signal is small. The optical disc apparatus corrects optical crosstalk with high precision even when the tracking control is on. When the tracking control is on (in the vicinity of the on-track point), the amplitude of the signal component of the TE signal that leaks into the FE signal is small. In this case, if the correction amount used to correct optical crosstalk is determined based on the amplitude value and optical crosstalk is corrected based on the determined correction amount, the optical crosstalk cannot be corrected with high precision. The optical disc apparatus determines the correction amount used to correct optical crosstalk based on a differential value of the signal component of the TE signal that leaks into the FE signal. In this case, the optical disc apparatus corrects optical crosstalk with high precision even when the tracking control is on (in the vicinity of the on-track point). The "differential value" herein intends to include a difference value (gradient value). For example, the differential value also refers to a difference (gradient) between signal values that are sampled in predetermined cycles.

A third aspect of the present invention provides the optical disc apparatus of one of the first and second aspects of the present invention in which the optical crosstalk correction amount determination unit determines a rough correction amount of the correction amount used to correct the output of the tracking error detection unit based on an amplitude value of a signal component of the tracking error signal that leaks into the focus error signal when focus control of the spot is being executed and tracking control of the spot is not being executed. The optical crosstalk correction amount determination unit determines a precise correction amount of the correction amount used to correct the output of the tracking error detection unit based on a differential amount of the signal component of the tracking error signal that leaks into the focus error signal when focus control of the spot is being executed and tracking control of the spot is being executed.

This optical disc apparatus first calculates the rough correction value and then calculates the precise correction value to determine the correction amount used to correct optical crosstalk. Therefore, the optical disc apparatus determines the correction amount used to correct optical crosstalk precisely in a short period of time.

A fourth aspect of the present invention provides the optical disc apparatus of the third aspect of the present invention further including a disturbance addition unit. The disturbance addition unit adds a disturbance signal to an output of the tracking control unit. The disturbance addition unit adds a disturbance signal that has a frequency and an amplitude outside a band of the tracking control and the focus control when the tracking control is being executed. The optical crosstalk correction amount determination unit determines the precise correction amount of the correction amount used to correct the output of the tracking error detection unit based on the signal component of the tracking error signal that leaks into the focus error signal generated when the disturbance signal is added.

In the optical disc apparatus, the disturbance addition unit adds a disturbance signal that has a frequency and an amplitude outside a band of the tracking control and the focus control when the tracking control is being executed. Thus, the optical disc apparatus determines the precise correction amount efficiently. Further, the disturbance signal with the frequency and the amplitude that are outside the band of the tracking control and the focus control is used. The precise correction amount is determined without the disturbance signal affecting the tracking control and the focus control.

A fifth aspect of the present invention provides the optical disc apparatus of one of the first to fourth aspects of the present invention further including a tracking polarity determination unit. The tracking polarity determination unit determines which one of the land and the groove of the track is to be subjected to the tracking control. The optical crosstalk correction amount determination unit sets the correction amount based on an output of the tracking polarity determination unit.

This structure prevents the correction amount from deviating due to a change in the modulation depth of a tracking error signal depending on whether the tracking error signal corresponds to a land or a groove of the track of the optical disc. The optical disc apparatus reduces power consumption and improves focus control stability.

A sixth aspect of the present invention provides the optical disc apparatus of the fifth aspect of the present invention in which the optical crosstalk correction amount determination unit determines the correction amount based on at least one of the land and the groove.

A seventh aspect of the present invention provides the optical disc apparatus of the fifth aspect of the present invention in which the optical crosstalk correction amount determination unit determines the correction amount corresponding to the groove based on the correction amount corresponding to the land.

This structure eliminates the need for separately determining the correction amount corresponding to a groove. The correction amount corresponding to a groove is determined efficiently based on the correction amount corresponding to a land.

An eighth aspect of the present invention provides the optical disc apparatus of the fifth aspect of the present invention in which the optical crosstalk correction amount determination unit determines the correction amount corresponding to the land based on the correction amount corresponding to the groove.

This structure eliminates the need for separately determining the correction amount corresponding to a land. The correction amount corresponding to a land is determined efficiently based on the correction amount corresponding to a groove.

A ninth aspect of the present invention provides the optical disc apparatus of one of the first to fourth aspects of the present invention in which the optical disc has two or more recordable and readable layers. The apparatus further includes an interlayer movement unit and a layer determination unit. The interlayer movement unit moves the spot from one of the layers to another one of the layers. The layer determination unit determines the layer on which the spot is focused. The optical crosstalk correction amount determination unit sets the correction amount based on an output of the layer determination unit.

This optical disc apparatus corrects optical crosstalk in an appropriate manner even for an optical disc that includes multiple layers.

A tenth aspect of the present invention provides the optical disc apparatus of the ninth aspect of the present invention in which the optical crosstalk correction amount determination unit calculates the correction amount corresponding to each layer of the optical disc.

This optical disc apparatus corrects optical crosstalk while considering differences between layers even for an optical disc that includes multiple layers.

An eleventh aspect of the present invention provides the optical disc apparatus of the ninth aspect of the present invention in which the optical crosstalk correction amount determination unit uses the correction amount corresponding to the one of the layers to determine the correction amount of the other one of the layers.

This optical disc apparatus efficiently determines the correction amount corresponding to the other layer.

A twelfth aspect of the present invention provides the optical disc apparatus of one of the first to fourth aspects of the present invention further including an offset determination unit and an offset adder. The offset determination unit determines an offset value that is added to an output of the focus error detection unit. The offset adder adds the offset value determined by the offset determination unit to the output of the focus error detection unit. The adder adds an output of the offset adder to an output of the multiplier. The optical crosstalk correction amount determination unit sets the correction amount according to the offset value determined by the offset determination unit.

This optical disc apparatus corrects optical crosstalk in an appropriate manner according to the offset.

A thirteenth aspect of the present invention provides the optical disc apparatus of the twelfth aspect of the present invention in which the optical crosstalk correction amount determination unit uses the correction amount corresponding to one of a plurality of offset values determined by the offset determination unit to determine the correction amount corresponding to another one of the offset values.

This optical disc apparatus efficiently determines the correction amount corresponding to the other layer.

A fourteenth aspect of the present invention provides the optical disc apparatus of the twelfth aspect of the present invention in which the optical crosstalk correction amount determination unit recalculates the correction amount corresponding to a case in which the offset value is B when the offset value changes from A to B.

This optical disc apparatus corrects optical crosstalk in an appropriate manner according to a change in the offset value.

A fifteenth aspect of the present invention provides the optical disc apparatus of one of the first to fourth aspects of the present invention further including a spherical aberration detection unit and a spherical aberration correction unit. The spherical aberration detection unit detects a spherical aberration correction amount used to correct a spherical aberration generated at the spot on the disc. The spherical aberration correction unit corrects the spherical aberration based on the spherical aberration correction amount detected by the spherical aberration detection unit. The optical crosstalk correction amount determination unit sets the correction amount based on the spherical aberration correction amount detected by the spherical aberration detection unit.

This optical disc apparatus corrects optical crosstalk while considering a spherical aberration in an appropriate manner.

A sixteenth aspect of the present invention provides the optical disc apparatus of the fifteenth aspect of the present invention in which the optical crosstalk correction amount determination unit uses one of a plurality of spherical aberration correction amounts detected by the spherical aberration detection unit to determine another one of the spherical aberration correction amounts.

This optical disc apparatus efficiently determines the correction amount corresponding to the other spherical aberration correction amount.

A seventeenth aspect of the present invention provides the optical disc apparatus of the fifteenth aspect of the present invention in which the optical crosstalk correction amount determination unit recalculates the correction amount corresponding to a case in which the spherical aberration correction amount is B when the spherical aberration correction amount detected by the spherical aberration detection unit changes from A to B.

This optical disc apparatus corrects optical crosstalk in an appropriate manner according to a change in the spherical aberration amount.

An eighteenth aspect of the present invention provides the optical disc apparatus of one of the first to fourth aspects of the present invention further including a radial tilt detection unit and a radial tilt correction unit. The radial tilt detection unit detects a radial tilt amount of the optical disc. The radial tilt correction unit corrects the radial tilt amount based on the radial tilt amount determined by the radial tilt detection unit. The optical crosstalk correction amount determination unit sets the correction amount according to the radial tilt amount detected by the radial tilt detection unit.

This optical disc apparatus corrects optical crosstalk in an appropriate manner according to the radial tilt amount.

A nineteenth aspect of the present invention provides the optical disc apparatus of the eighteenth aspect of the present invention in which the optical crosstalk correction amount determination unit uses the correction amount corresponding to one of a plurality of radial tilt amounts detected by the radial tilt detection unit to determine the correction amount corresponding to another one of the radial tilt amounts.

This optical disc apparatus efficiently determines the correction amount corresponding to the other radial tilt amount.

A twentieth aspect of the present invention provides the optical disc apparatus of the eighteenth aspect of the present invention in which the optical crosstalk correction amount determination unit determines the correction amount corresponding to a case in which the radial tilt amount is B when the radial tilt amount detected by the radial tilt detection unit changes from A to B.

This optical disc apparatus efficiently determines the correction amount corresponding to the other radial tilt amount.

A twenty first aspect of the present invention provides a crosstalk correction method used in an optical disc apparatus that records and reads information onto and from an optical disc having a track including a land and a groove. The method includes a focus error detection process, a tracking error detection process, an optical crosstalk correction amount determination process, a multiplication process, an addition process, a focus control process, and a tracking control process. In the focus error detection process, a focus error signal is detected based on reflection light from a spot of light focused on the optical disc and the focus error signal is output. In the tracking error detection process, a tracking error signal is detected based on the reflection light and the tracking error signal is output. In the optical crosstalk correction amount determination process, a correction amount used to correct an output of the tracking error detection unit is determined based on optical crosstalk from the tracking error signal to the focus error signal occurring in reflection light from the optical disc when the spot crosses the track. In the multiplication process, an output of the tracking error detection unit is multiplied by the correction amount determined by the optical crosstalk correction amount determination unit. In the addition process, an output of the focus error detection unit and an output of the multiplier are added. In the focus control process, focus of the spot is controlled based on an output of the adder. In the tracking control process, tracking control is executed based on an output of the tracking error detection unit.

The crosstalk correction method has the same advantageous effects as the first aspect of the present invention.

A twenty second aspect of the present invention provides a crosstalk correction method including setting a correction amount that is used to correct optical crosstalk from a tracking error signal to a focus error signal occurring in reflection light from an optical disc that has a track including a land and a groove when a spot of light focused onto the optical disc crosses the track, multiplying a tracking error signal that indicates a shift between the track and the spot focused onto the optical disc by the correction amount, and adding a result of the multiplication to a focus error signal indicating a converging state of the spot onto the optical disc.

The crosstalk correction method has the same advantageous effects as the first aspect of the present invention.

This method prevents the correction amount from deviating due to a change in the modulation depth of a tracking error signal depending on whether the tracking error signal corresponds to a land or a groove of the track of the optical disc. When the crosstalk correction method is used in the optical disc apparatus, the optical disc apparatus reduces power consumption and improves focus control stability.

A twenty third aspect of the present invention provides the crosstalk correction method of the twenty second aspect of the present invention in which the correction amount corresponding to at least one of the land and the groove is calculated.

A twenty fourth aspect of the present invention provides the crosstalk correction method of the twenty second aspect of the present invention in which the correction amount corresponding to the groove is determined based on the correction amount corresponding to the land.

A twenty fifth aspect of the present invention provides the crosstalk correction method of the twenty second aspect of the present invention in which the correction amount corresponding to the land is determined based on the correction amount corresponding to the groove.

A twenty sixth aspect of the present invention provides a crosstalk correction method including setting a correction amount that is used to correct optical crosstalk from a tracking error signal to a focus error signal occurring in reflection light from an optical disc when a light spot crosses a track of the optical disc according to a layer of the optical disc, and multiplying a tracking error signal indicating a shift between the track and the light spot focused onto the optical disc by the correction amount, and adding a result of the multiplication to a focus error signal indicating a converging state of the light spot onto the optical disc.

This method corrects optical crosstalk even for an optical disc that has multiple layers while considering differences between layers.

A twenty seventh aspect of the present invention provides the crosstalk correction method of the twenty sixth aspect of the present invention in which the correction amount corresponding to each layer of the optical disc is calculated.

A twenty eighth aspect of the present invention provides the crosstalk correction method of the twenty sixth aspect of the present invention in which the correction amount corresponding to one of the layers is used to determine the correction amount corresponding to another one of the layers.

A twenty ninth aspect of the present invention provides a crosstalk correction method including setting a correction amount that is used to correct optical crosstalk from a tracking error signal to a focus error signal occurring in reflection light from an optical disc when a light spot crosses a track of the optical disc according to an offset value that is added to the focus error signal, and multiplying a tracking error signal indicating a shift between the track and the light spot focused on the optical disc by the correction amount, and adding a result of the multiplication to a focus error signal indicating a converging state of the light spot onto the optical disc.

With this method, optical crosstalk is corrected in an appropriate manner according to the offset.

A thirty aspect of the present invention provides the crosstalk correction method of the twenty ninth aspect of the present invention in which the correction amount corresponding to one of a plurality of offset values is determined based on the correction amount corresponding to another one of the offset values.

A thirty first aspect of the present invention provides the crosstalk correction method of the twenty ninth aspect of the present invention in which the correction amount corresponding to a case in which the offset value is B is recalculated when the offset value changes from A to B.

A thirty second aspect of the present invention provides a crosstalk correction method including setting a correction amount that is used to correct optical crosstalk from a tracking error signal to a focus error signal occurring in reflection light from an optical disc when a light spot crosses a track of the optical disc according to a spherical aberration generated at the light spot on the optical disc, and multiplying a tracking error signal indicating a shift between the track and the light spot focused on the optical disc by the correction amount, and adding a result of the multiplication to a focus error signal indicating a converging state of the light spot onto the optical disc.

A thirty third aspect of the present invention provides the crosstalk correction method of the thirty second aspect of the present invention in which the correction amount corresponding to one of a plurality of spherical aberration correction amounts is used to determine the correction amount corresponding to another one of the spherical aberration correction amounts.

A thirty fourth aspect of the present invention provides the crosstalk correction method of the thirty second aspect of the present invention in which the correction amount corresponding to a case in which the spherical aberration correction amount is B is recalculated when the spherical aberration correction amount changes from A to B.

A thirty fifth aspect of the present invention provides a crosstalk correction method including setting a correction amount that is used to correct optical crosstalk from a tracking error signal to a focus error signal occurring in reflection light from an optical disc when a light spot crosses a track of the optical disc according to a radial tilt correction amount used to correct a radial tilt amount generated at the light spot on the optical disc, and multiplying a tracking error signal indicating a shift between the track and the light spot focused on the optical disc by the correction amount, and adding a result of the multiplication to a focus error signal indicating a converging state of the light spot onto the optical disc.

With this method, optical crosstalk is corrected in an appropriate manner according to the radial tilt amount.

A thirty sixth aspect of the present invention provides the crosstalk correction method of the thirty fifth aspect of the present invention in which the correction amount corresponding to one of a plurality of radial tilt correction amounts is determined based on the correction amount corresponding to another one of the radial tilt correction amounts.

A thirty seventh aspect of the present invention provides the crosstalk correction method of the thirty fifth aspect of the present invention in which the correction amount corresponding to a case in which the radial tilt correction amount is B is recalculated when the radial tilt correction amount changes from A to B.

A thirty eighth aspect of the present invention provides an integrated circuit used in an optical disc apparatus that records and reads information onto and from an optical disc having a track including a land and a groove. The integrated circuit includes a focus error detection unit, a tracking error detection unit, an optical crosstalk correction amount determination unit, a multiplier, an adder, a focus control unit, and a tracking control unit. The focus error detection unit detects a focus error signal based on reflection light from a spot of light focused on the optical disc and outputs the focus error signal. The tracking error detection unit detects a tracking error signal based on the reflection light and outputs the tracking error signal. The optical crosstalk correction amount determination unit determines a correction amount used to correct an output of the tracking error detection unit based on optical crosstalk from the tracking error signal to the focus error signal occurring in reflection light from the optical disc when the spot crosses the track. The multiplier multiplies an output of the tracking error detection unit by the correction amount determined by the optical crosstalk correction amount determination unit. The adder adds an output of the focus error detection unit and an output of the multiplier. The focus control unit controls focus of the spot based on an output of the adder. The tracking control unit executes tracking control based on an output of the tracking error detection unit.

The integrated circuit has the same advantageous effects as the first aspect of the present invention.

Advantageous Effects

The present invention corrects optical crosstalk in an appropriate manner by setting an optical crosstalk correction amount suitable for a land or a groove, a layer, a focus offset amount, a spherical aberration amount, or a radial tilt amount both while the tracking control is off and while the tracking control is on, and enables an optical disc apparatus to reduce power consumption and improve focus control stability.

It is another object of the present invention to provide a crosstalk correction method and an integrated circuit used in the optical disc apparatus.

DRAWINGS

EXPLANATION OF REFERENCE

Figure 1:
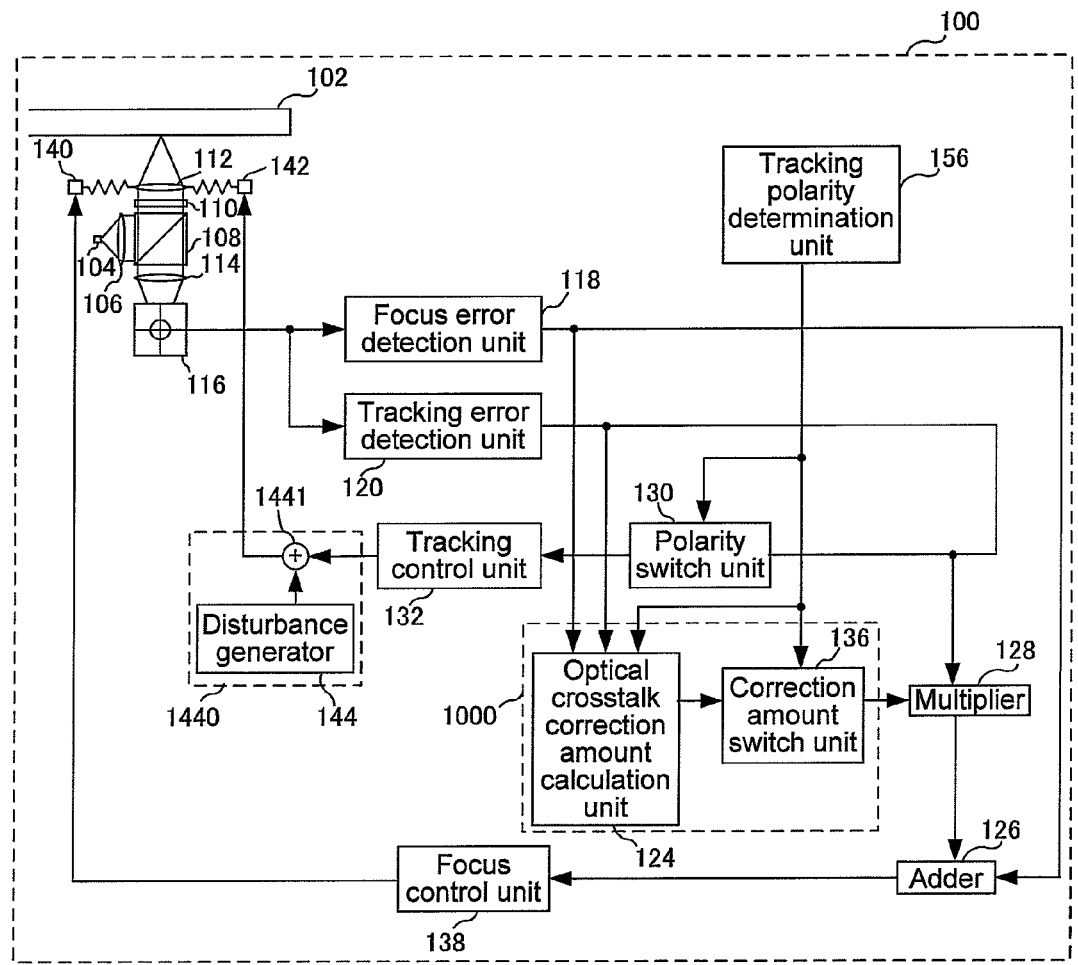
FIG. 1 shows an optical disc apparatus according to a first embodiment of the present invention.

100, 200, 300, 400, 500 optical disc apparatus
102 optical disc
104 light source
106 coupling lens 108 polarization beam splitter
110 polarization plate
112 converging lens
113 focusing lens
116 light receiving element
118 focus error detection unit
120 tracking error detection unit
124 optical crosstalk correction amount calculation unit
126 adder
128 multiplier
130 polarization switch unit
132 tracking control unit
136 correction amount switch unit
138 focus control unit
1440 disturbance addition unit
140 disturbance generator
142 vertical movement unit
144 horizontal movement unit
156 tracking polarity determination unit
202 layer determination unit
206 interlayer movement unit
302 offset determination unit
306 offset adder
404 spherical aberration detection unit
402 spherical aberration correction unit
502 radial tilt detection unit
504 radial tilt correction unit

BEST MODE FOR CARRYING OUT THE INVENTION

First Embodiment

Structure of the Optical Disc Apparatus

FIG. 1 is a block diagram showing the structure of an optical disc apparatus 100 according to a first embodiment of the present invention.

The optical disc apparatus 100 of the present invention includes an optical head (mainly composed of a light source 104, a coupling lens 106, a polarization beam splitter 108, a polarization plate 110, a converging lens 112, a focusing lens 114, and a light receiving element 116) for reading information from an optical disc 102 and recording information onto the optical disc 102.

Figure 2A:
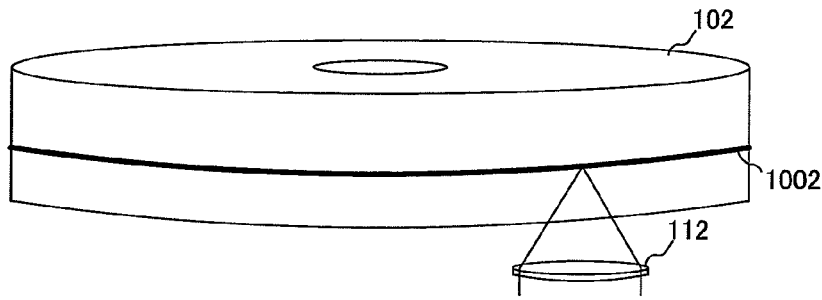
FIGS. 2A and 2B show an optical disc that is processed by the optical disc apparatus according to the first to fifth embodiments of the present invention.
Figure 2B:
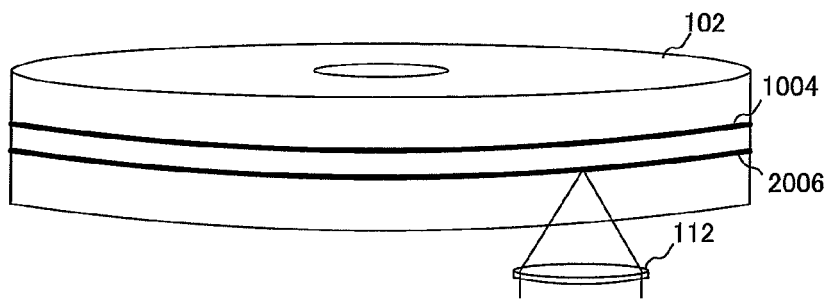
Figure 3:
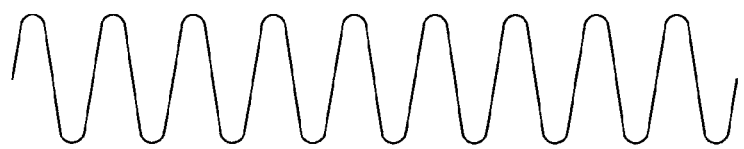
FIG. 3 shows an example of measurement of optical crosstalk in the first to fifth embodiments of the present invention.
Figure 3:
Figure 3:
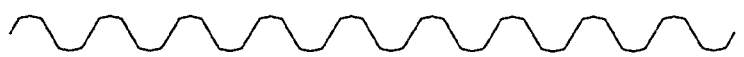

The optical disc 102 is an information medium that can be accessed with a light beam. The optical disc 102 includes tracks that are composed of lands and grooves. Information is read from at least one of a land and a grove. Information is recorded onto at least one of a land and a groove. The optical disc 102 may have a single layer 1002, onto which or from which information can be recorded or read as shown in FIG. 2A, or may have two layers 1004 and 2006 as shown in FIG. 2B, or may have three or more layers. The optical disc 102 may be, for example, a DVD-ROM, a DVD-RAM, a DVD-R, a DVD+R, a DVD-RW, or DVD+RW, or may be an optical disc for an infrared light source or an optical disc for a blue light source.

The light source 104 is an element that emits diffusion light. The light source 104 may be, for example, a semiconductor laser, and may specifically be an infrared light source, a red light source, or a blue light source. A light beam emitted from the light source 104 is collimated through the coupling lens 106, and is reflected by the polarization beam splitter 108, passes through the polarization plate 110, and converges through the converging lens 112. The convergent light beam forms a light spot that has the point of focus in the vertical direction of the optical disc 102.

Reflection light from the optical disc 102 passes through the converging lens 112, the polarization plate 110, and the polarization beam splitter 108, and is input into the light receiving element 116 through the focusing lens 114. An output of the light receiving element 116 is input into a focus error detection unit 118 and a tracking error detection unit 120. An output of the focus error detection unit 118 is input into an optical crosstalk correction amount calculation unit 124 and an adder 126. An output of the tracking error detection unit 120 is input into the optical crosstalk correction amount calculation unit 124, a multiplier 128, and a polarity switch unit 130. An output of the polarity switch unit 130 is input into a tracking control unit 132. An output of the optical crosstalk correction amount calculation unit 124 is input into a correction amount switch unit 136. An output of the correction amount switch unit 136 is input into the multiplier 128. An output of the multiplier 128 is obtained by multiplying the output of the tracking error detection unit 120 by the output of the correction amount switch unit 136, and is input into the adder 126. The adder 126 adds the output of the multiplier 128 to the output of the focus error detection unit 118. An output of the adder 126 is input into a focus control unit 138. An output of the focus control unit 138 is input into a vertical movement unit 140. An output of the tracking control unit 132 is input into a horizontal movement unit 142 via a disturbance addition unit 1440. An output of a tracking polarity determination unit 156 is input into the polarity switch unit 130, the optical crosstalk correction amount calculation unit 124, and the correction amount switch unit 136.

The disturbance addition unit 1440 includes a disturbance generator 144 and an adder 1441. The disturbance generator 144 generates a disturbance signal. The adder 1441 adds an output of the disturbance generator 144 and an output of the tracking control unit 132, and outputs the sum to the horizontal movement unit 142.

The optical crosstalk correction amount calculation unit 124 and the correction amount switch unit form an optical crosstalk correction amount determination unit 1000.

The light receiving element 116 is divided in a plurality of elements, for example, in two or four elements, each of which outputs a signal according to its light receiving amount.

The focus error detection unit 118 detects a positional shift signal (FE signal) indicating a positional shift between the light spot and the vertical position of the recording or readout layer of the optical disc 102. The FE signal may be detected with, for example, an astigmatic method, or a spot sized detection (SSD) method.

The tracking error detection unit 120 detects a positional shift signal (TE signal) indicating a positional shift between the light spot and the horizontal position of a track on the optical disc 102, and outputs the TE signal. The TE signal may be detected with, for example, a push-pull (PP) method, a three-beam method, or a phase-difference method.

The optical crosstalk correction amount calculation unit 124 measures a leaking signal component of a tracking error signal that leaks into a focus error signal (hereafter referred to as "optical crosstalk"), which occurs in reflection light from the optical disc 102 when the light spot crosses a track on the optical disc 102. The optical crosstalk correction amount calculation unit 124 determines a correction amount used to correct the optical crosstalk. The optical crosstalk may be measured by, for example, measuring the amplitude of an output of the focus error detection unit 118 and the amplitude of an output of the tracking error detection unit 120 when a sine wave disturbance with a specific frequency is generated by the disturbance generator 144 and the light spot is forced to be off the track by the disturbance.

The optical crosstalk correction in this case will be described.

First, focus control is set on and tracking control is set off in the optical disc apparatus 100. The amplitude of an FE signal is measured and an amount of optical crosstalk (hereafter referred to as an "optical crosstalk amount") is calculated. A rough correction value Gα, which is a rough value of an optical crosstalk correction amount, is then calculated based on the calculated optical crosstalk amount. This processing corresponds to the processing of calculating the gain value G with formula 3 described above.

The tracking control is then set on while the focus control is maintained on. While the tracking control is being executed in the optical disc apparatus, the disturbance addition unit 1440 adds a disturbance signal, which has a frequency and an amplitude that are outside the band of the tracking control and the focus control, to an output of the tracking control unit 132. In this state, a crosstalk amount is calculated based on a differential value (difference value) indicating a gradient of the TE signal and a differential value (difference value) indicating a gradient of the FE signal. A precise value Gα' of the optical crosstalk correction amount is calculated based on the calculated crosstalk amount. This processing corresponds to the processing of calculating the gain value G with formula 5 described above. This processing will be described in more detail with reference to FIGS. 32 and 33.

Figure 32:
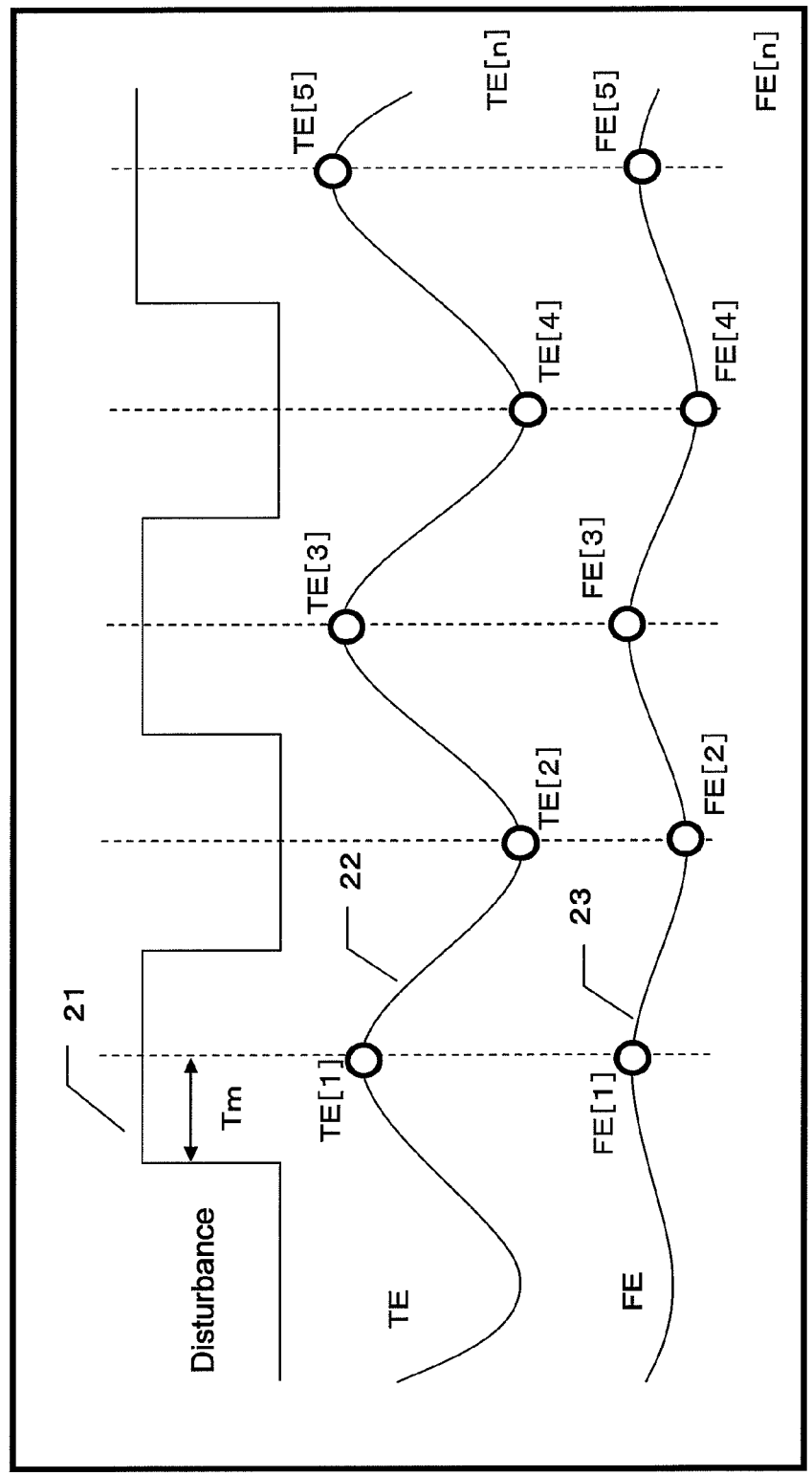
FIG. 32 shows one example of a disturbance signal, a TE signal, and an FE signal.

FIG. 32 shows a disturbance signal 21, a TE signal 22, and an FE signal 23. The disturbance signal 21 with a rectangular waveform is generated while the focus control is being executed and the tracking control is being executed. The TE signal 22 and the FE signal change accordingly as the disturbance signal 21 changes. The TE signal 22 and the FE signal have a maximum displacement point after substantially uniform time (Tm) from the rising edge of the disturbance signal 21 with the rectangular waveform, and have a minimum displacement point after substantially the uniform time (Tm) from the falling edge of the disturbance signal 21 with the rectangular waveform. An displacement amount (optical crosstalk amount) by which the FE signal is displaced due to the TE signal is written as formula 6.

$$\text{Optical crosstalk amount} = \sum_n \frac{FE[n+1] - FE[n]}{TE[n+1] - TE[n]} \cdot (-1)^n \quad \text{Formula 6}$$

where TE[n] is a displacement value of the TE signal and FE[n] is a displacement value of the FE signal after the time Tm with a certain timing value elapses from the edge of the disturbance signal 21.

The optical crosstalk amount calculated with formula 6 can also be used to determine the phase relationship between the TE signal and the FE signal based on the sign of the calculated value.

A method for calculating the precise value Gα' of the optical crosstalk correction amount based on the optical crosstalk amount calculated in the manner described above will now be described with reference to FIG. 33.

Figure 33:
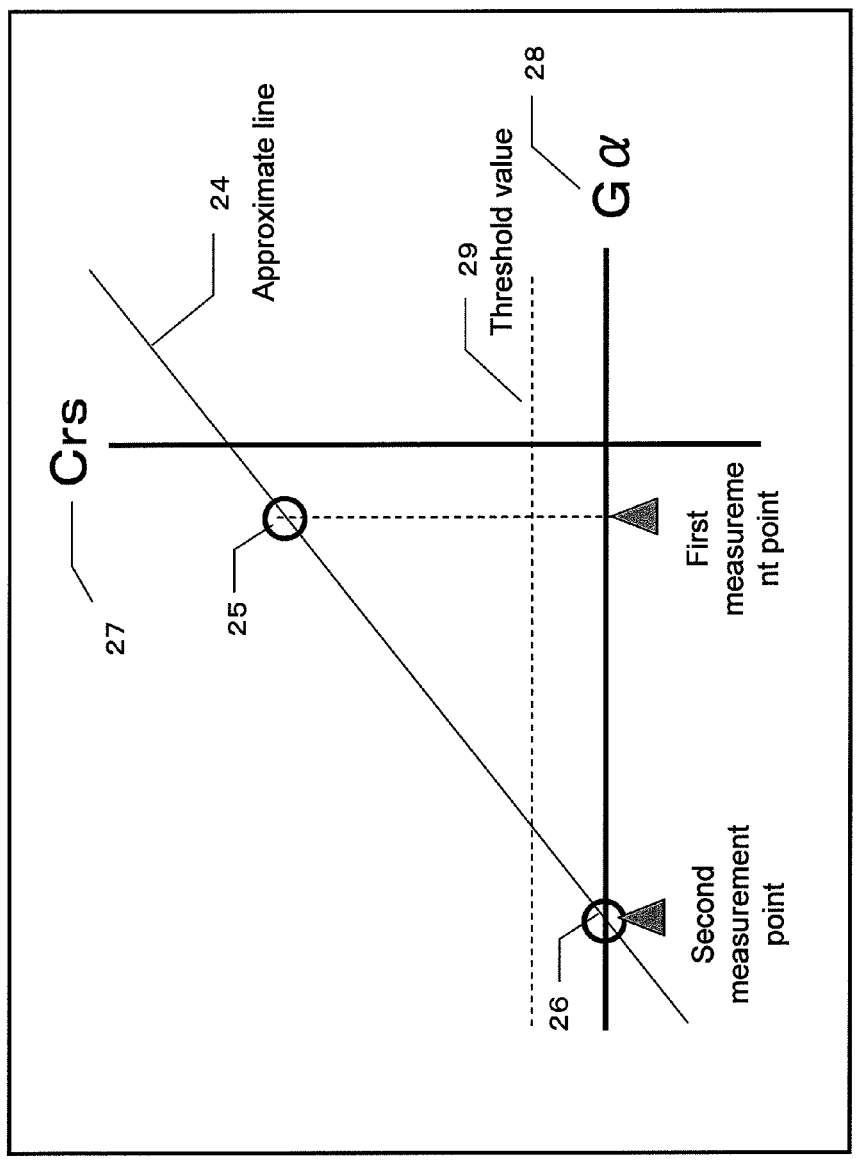
FIG. 33 is a graph showing the relationship between the gain value $G\alpha$ and the optical crosstalk amount.

FIG. 33 is a graph showing the gain value G α for determining the optical crosstalk correction amount on the horizontal axis and the optical crosstalk amount (hereafter may be referred to as Crs) on the vertical axis. A straight line 24 in FIG. 33 is an approximate line used to calculate the gain value for determining the optical crosstalk correction amount. A point 25 is a first measurement point. A point 26 is a second measurement point.

The initial value of the gain value Gα is set at an appropriate value with which excessive correction is not performed. The optical crosstalk amount Crs is measured with the measurement method expressed using formula 6.

It is already clear that the values Gα and Crs have a linear correlation. Thus, the value Gα that causes the value Crs to be zero is easily calculated using the linear approximate line 24 based on the value at the first measurement point 25 measured by setting the initial value of the value Gα. The value Gα that causes the value Crs to be zero is used as the precise value Gα' of the optical crosstalk correction amount. The optical crosstalk correction amount is determined in this manner.

Figure 4:
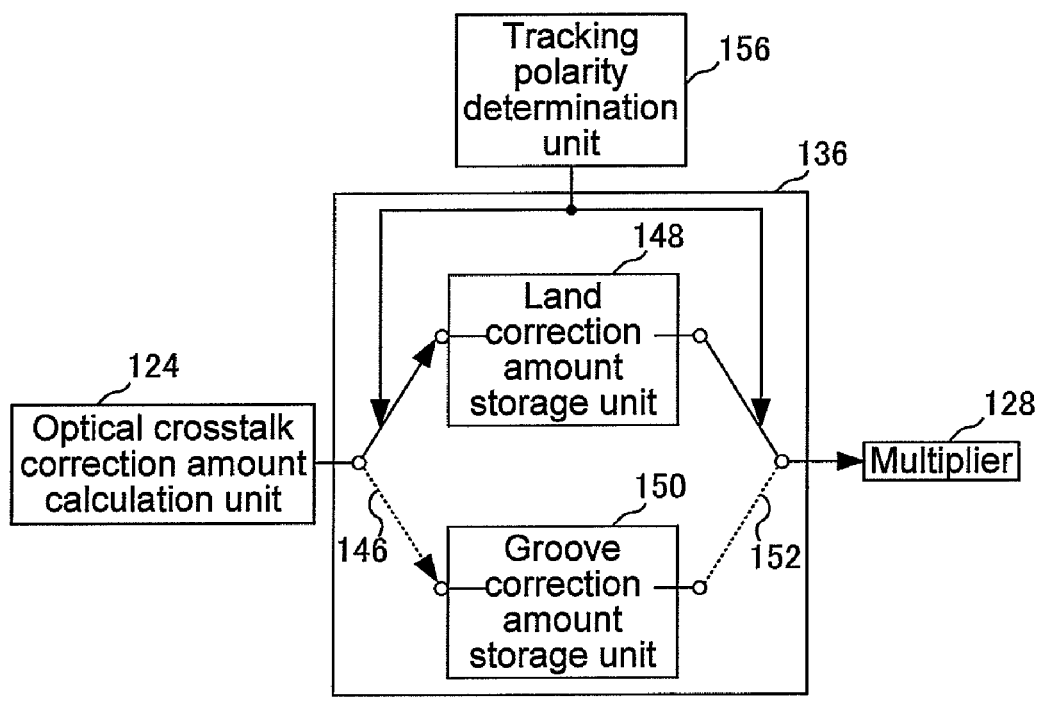
FIG. 4 shows an optical crosstalk correction amount setting unit 1 according to the first embodiment of the present invention.

As shown in FIG. 4, the correction amount switch unit 136 mainly includes a correction amount input switch unit 146, a land correction amount storage unit 148, a groove correction amount storage unit 150, and a correction amount output switch unit 152. The correction amount input switch unit 146 selects whether the correction amount input from the optical crosstalk correction amount calculation unit 124 is to be input into the land correction amount storage unit 148 or to be input into the groove correction amount storage unit 150 based on an output of the tracking polarity determination unit 156. The land correction amount storage unit 148 stores and maintains an optical crosstalk correction amount for a land based on the output of the tracking polarity determination unit 156 that indicates a "land". The groove correction amount storage unit 150 stores and maintains an optical crosstalk correction amount for a groove based on the output of the tracking polarity determination unit 156 that indicates a "groove". The correction amount output switch unit 152 selects an output to the multiplier 128 based on the output of the tracking polarity determination unit 156.

The focus control unit 138 generates a control signal in a manner to set the light focusing state of the light spot onto the optical disc 102 substantially uniform based on an input signal. For example, a phase compensation filter may be used as the focus control unit 138.

The polarity switch unit 130 inverts (switches) the polarity of a tracking error signal based on the output of the tracking polarity determination unit 156. For example, when the output of the tracking polarity determination unit 156 indicates a land, the polarity switch unit 130 inverts the output of the tracking error detection unit 120. When the output of the tracking polarity determination unit 156 indicates a groove, the polarity switch unit 130 does not invert the output of the tracking error detection unit 120.

The tracking control unit 132 generates a control signal in a manner that the light spot scans a substantially uniform range from the center of the track on the optical disc 102 based on an input signal. For example, a phase compensation filter may be used as the tracking control unit 132.

The vertical movement unit 140 moves the converging lens 112 in the vertical direction with respect to the optical disc 102. For example, an actuator is used as the vertical movement unit 140.

The horizontal movement unit 142 moves the converging lens 112 in the horizontal direction with respect to the optical disc 102. For example, an actuator is used as the horizontal movement unit 142.

The tracking polarity determination unit 156 determines whether the polarity of a tracking error signal (hereafter referred to as the "tracking polarity") is to be switched to a land or a groove.

Operation of the Optical Disc Apparatus

Figure 5:
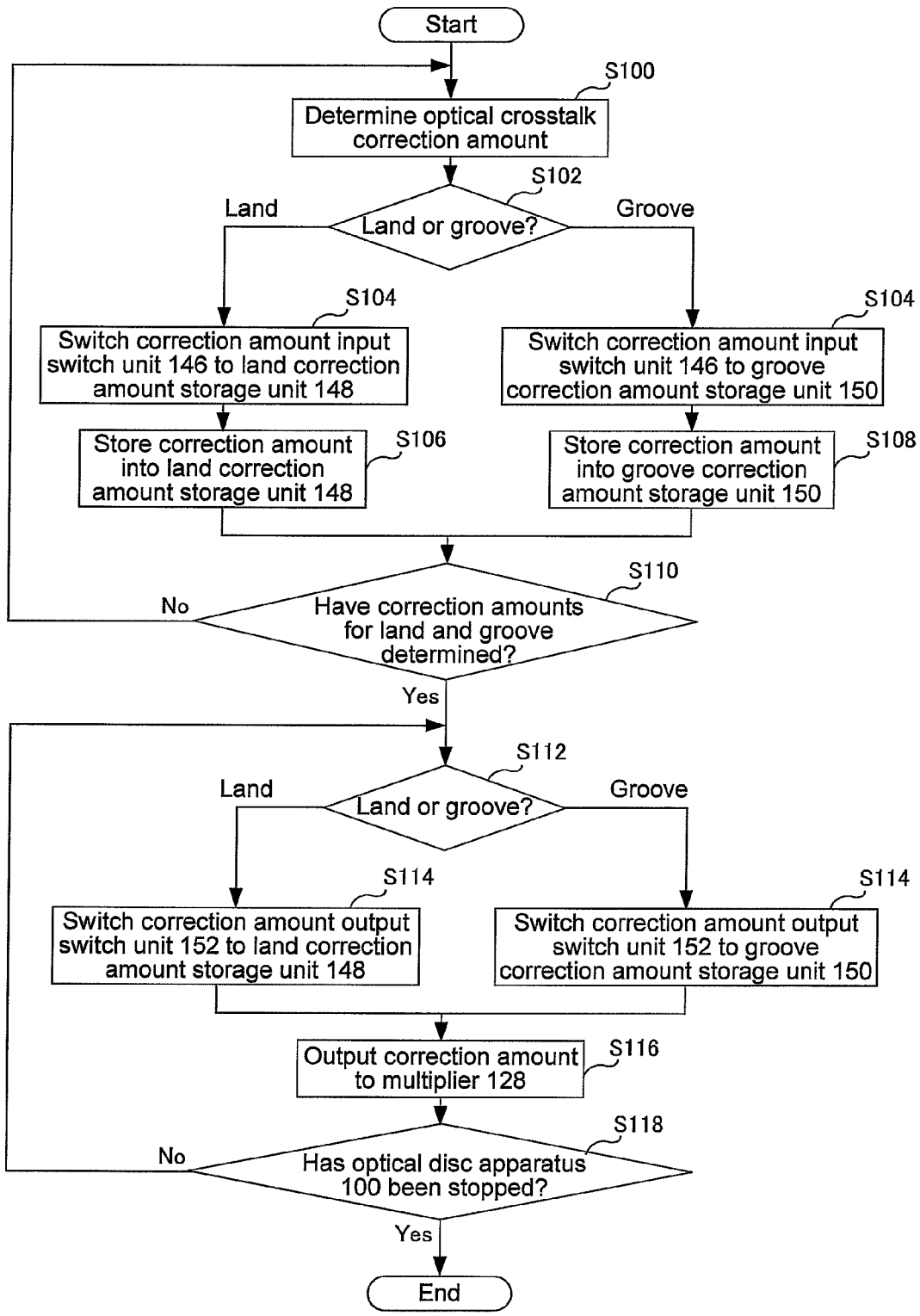
FIG. 5 is a flowchart showing processing performed in the first embodiment of the present invention.

The operation of the optical disc apparatus 100 according to the first embodiment with the above-described structure will now be described with reference to FIG. 5. FIG. 5 is a flowchart showing the operation for switching the optical crosstalk correction amount according to a land or a groove in the first embodiment.

In the correction amount switch control, the optical crosstalk correction amount calculation unit 124 of the optical disc apparatus 100 first determines the crosstalk correction amount with the method described above (S100). The optical disc apparatus 100 determines whether the tracking polarity indicates a land or a groove based on an output of the tracking polarity determination unit 156 (S102). When the tracking polarity indicates a land, the correction amount input switch unit 146 operates (S104) to store the determined correction amount into the land correction amount storage unit 148 (S106). When the tracking polarity indicates a groove, the correction amount input switch unit 146 operates (S104) to store the determined correction amount into the groove correction amount storage unit 150 (S108).

The optical disc apparatus 100 determines whether each of the land correction amount storage unit 148 and the groove correction amount storage unit 150 stores a correction amount. When any of the land correction amount storage unit 148 and the groove correction amount storage unit 150 is yet to store a correction amount, the optical disc apparatus 100 measures the optical crosstalk until each correction amount storage unit stores a correction amount (S110). The determination may be performed based on the operation of storing the correction amount when, for example, the optical crosstalk amount calculated with formula 6 converges within a predetermined range. Although the above example describes the case in which the optical disc apparatus 100 calculates correction amounts for both a land and a groove, the optical disc apparatus 100 may calculate a correction amount for only a land or a groove. In this case, when calculating a correction amount only for a land, the optical disc apparatus 100 determines whether the land correction amount storage unit 148 stores a correction amount in step S110. When calculating a correction amount only for a groove, the optical disc apparatus 100 determines whether the groove correction amount storage unit 150 stores a correction amount in step S110.

The optical disc apparatus 100 determines whether the correction amount stored in the land correction amount storage unit 148 and the correction amount stored in the groove correction amount storage unit 150 correspond to the tracking polarity indicating a land or the tracking polarity indicating a groove based on the output of the tracking polarity determination unit 156 (S112). When the tracking polarity indicates a land, the correction amount output switch unit 152 operates (S114) to output the correction value stored in the land correction amount storage unit 148 to the multiplier 128 (S116). When the tracking polarity indicates a groove, the correction amount output switch unit 152 operates (S114) to output the correction value stored in the groove correction amount storage unit 150 to the multiplier 128 (S116). The processing from S112 to S116 is repeated until the optical disc apparatus 100 is stopped (S118).

Figure 6:
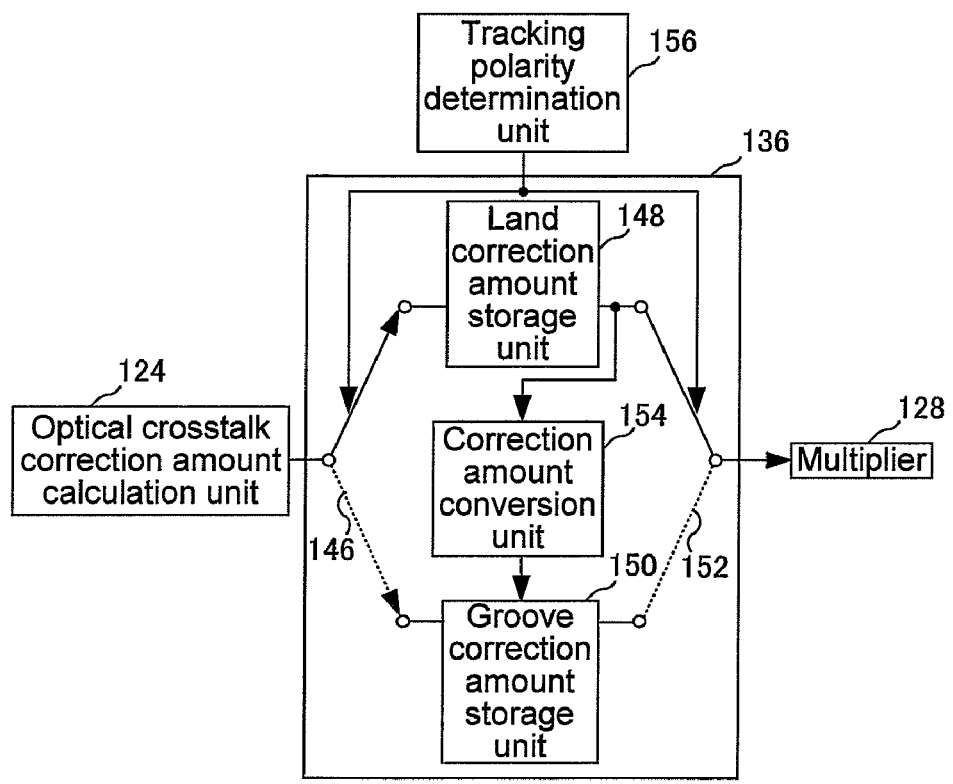
FIG. 6 shows an optical crosstalk correction setting unit 2 in the first embodiment of the present invention.

The correction amount switch unit 136 may have the structure shown in FIG. 6. In FIG. 6, the components that are the same as in FIG. 4 are given the same reference numerals those components and will not be described. A correction amount conversion unit 154 receives the correction amount corresponding to a land stored in the land correction amount storage unit 148, converts the correction amount corresponding to a land to a correction amount corresponding to a groove, and inputs the resulting correction amount into the groove correction amount storage unit 150. The correction amount conversion unit 154 measures the modulation depths of the tracking error signals corresponding to a land and a groove, and performs the correction amount conversion based on the measured modulation depths.

The operation of the optical disc apparatus according to the first embodiment that includes the correction amount switch unit 136 with the structure shown in FIG. 6 will now be described with reference to FIG. 7. The steps that are the same as in FIG. 5 are given the same reference numerals as in FIG. 5, and will not be described.

When the correction amount has been input in the land correction amount storage unit 148 in S106, the correction amount conversion unit 154 determines the correction amount corresponding to a groove based on the correction amount corresponding to a land (S120), and stores the determined correction amount of the groove into the groove correction amount storage unit 150 (S122).

The correction amount conversion unit 154 may determine the correction amount corresponding to a land based on the correction amount stored in the groove correction amount storage unit 150, and may store the determined correction amount into the land correction amount storage unit 148.

Figure 7:
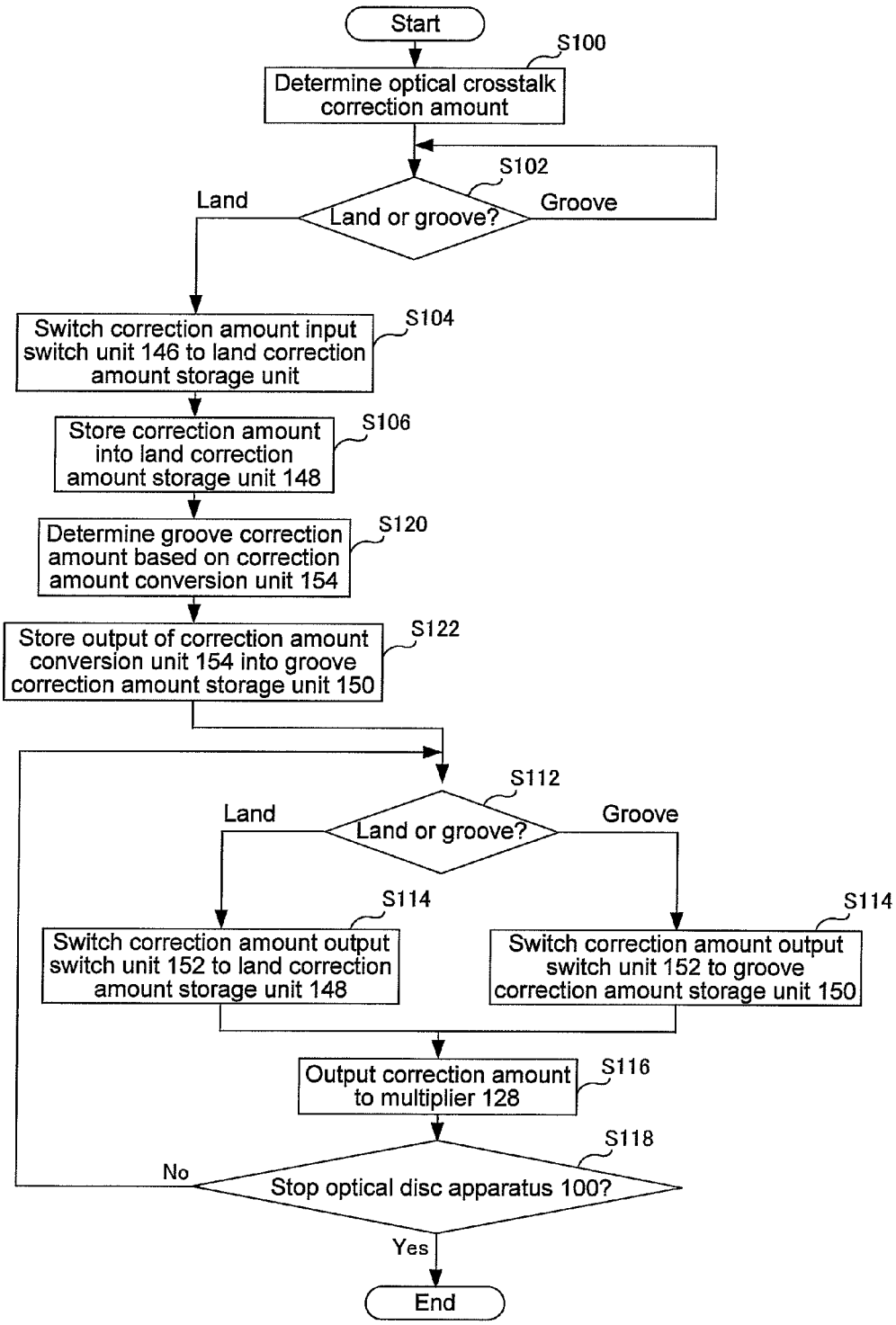
FIG. 7 is a flowchart showing processing performed in the first embodiment of the present invention.

In FIGS. 5 and 7, the processing in step S100 and the processing in step S102 may be replaced with each other. More specifically, the optical crosstalk correction amount calculation unit 124 may be operated to determine the correction amount based on the output of the tracking polarity determination unit 156.

Figure 30:
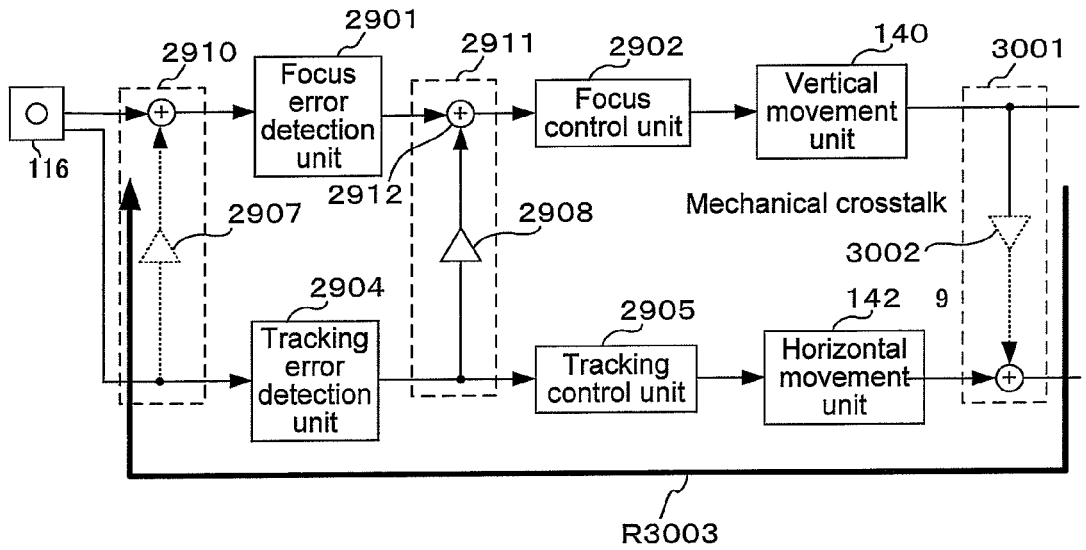
FIG. 30 is a block diagram of an optical disc apparatus that has optical crosstalk and mechanical crosstalk.
Figure 31A:
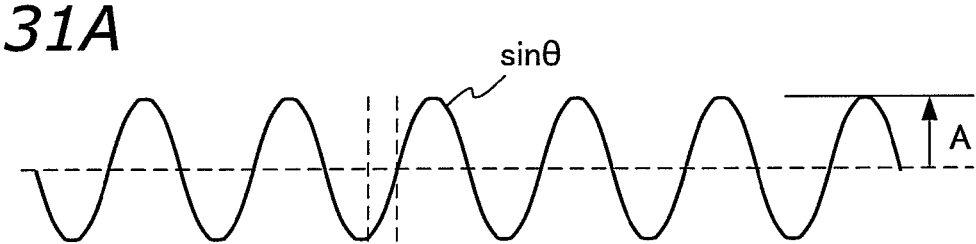
FIGS. 31A and 31B show one example of the waveform of a TE signal and the waveform of a TE signal component leaking into an FE signal.
Figure 31B:
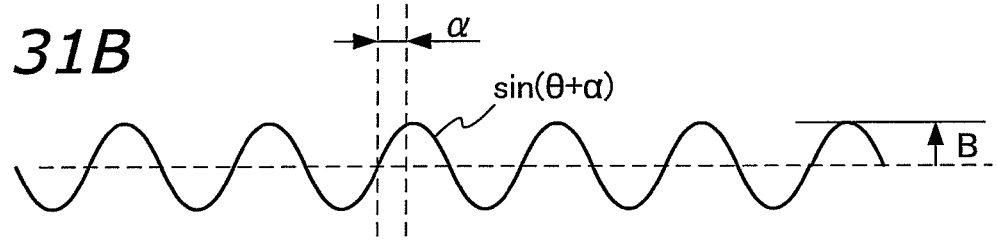

In the optical disc apparatus 100 of the first embodiment described above, the correction amount switch unit 136 switches the optical crosstalk correction value according to a land or a groove to set a correction amount suitable for a land or a groove and to correct differences in optical crosstalk caused by different modulation depths of tracking error signals between a land and a groove. This structure reduces the TE signal component leaking into the FE signal output from the focus error detection unit 118, and consequently reduces the need to drive the vertical movement unit 140. As a result, the optical disc apparatus 100 reduces power consumption. This structure also reduces undesired effects of the minor loop R3003 shown in FIG. 30. As a result, the optical disc apparatus 100 improves focus control stability. When the optical disc apparatus 100 includes the correction amount switch unit 136 shown in FIG. 6, the optical crosstalk correction amount calculation unit 124 is simply required to calculate the correction amount for only one track polarity. This shortens the time required to determine the correction amount for the other track polarity.

Second Embodiment

A second embodiment of the present invention will now be described.

Structure of the Optical Disc Apparatus

Figure 8:
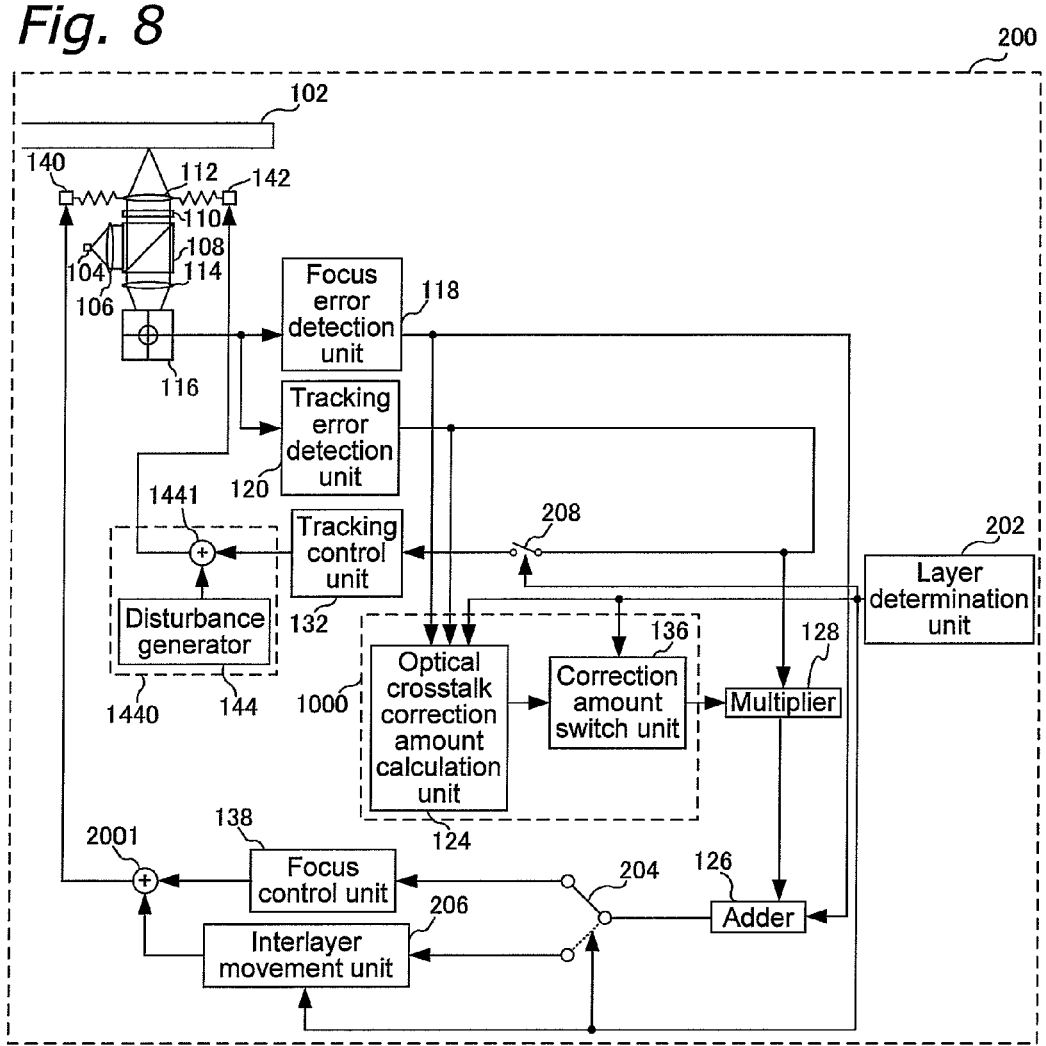
FIG. 8 shows an optical disc apparatus according to a second embodiment of the present invention.

FIG. 8 is a block diagram showing the structure of an optical disc apparatus 200 according to the second embodiment of the present invention. The components in the second embodiment that are the same as in the first embodiment described above are given the same reference numerals as in FIGS. 1 to 7, and will not be described. An optical disc 102 is formed by two layers or three or more layers as shown in FIG. 2B.

In the optical disc apparatus 200 according to the second embodiment, an output of a layer determination unit 202 is input into an optical crosstalk correction amount calculation unit 124, a correction amount switch unit 136, a switch 204, an interlayer movement unit 206, and a switch 208. The switch 204 selects whether an output of the adder 126 is to be input into a focus control unit 138 or into the interlayer movement unit 206 based on an output of the layer determination unit 202. An output of the interlayer movement unit 206 is input into the vertical movement unit 140 via the adder 2001. The switch 208 switches tracking control on and off based on the output of the layer determination unit 202.

The layer determination unit 202 determines whether the light spot is focused onto a layer 1004 or a layer 2006 of an optical disc 102 based on a target address for readout or a target address for a seek.

The interlayer movement unit 206 moves the light spot to a predetermined layer of the optical disc 102 based on an output of the layer determination unit 202. For example, the light spot may be jumped from one layer to the predetermined layer, or the light spot may be newly focused onto the predetermined layer.

Figure 9:
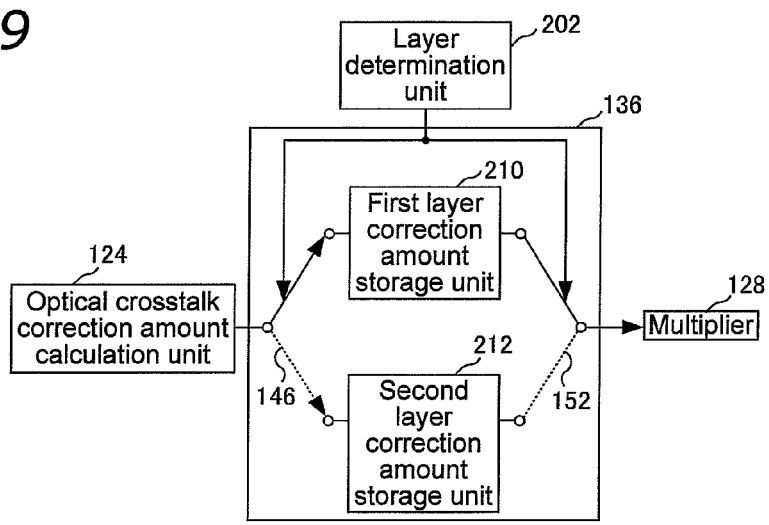
FIG. 9 shows an optical crosstalk correction amount setting unit 1 according to the second embodiment of the present invention.

As shown in FIG. 9, the correction amount switch unit 136 includes a correction amount input switch unit 146, a first layer correction amount storage unit 210 for storing a correction amount corresponding to the first layer, a second layer correction amount storage unit 212 for storing a correction amount corresponding to the second layer, and a correction amount output switch unit 152. The first layer correction amount storage unit 210 stores and maintains a correction amount corresponding to the case in which the output of the layer determination unit 202 indicates the first layer. The second layer correction amount storage unit 212 stores and maintains a correction amount corresponding to the case in which the output of the layer determination unit 202 indicates the second layer.

Operation of the Optical Disc Apparatus

Figure 10:
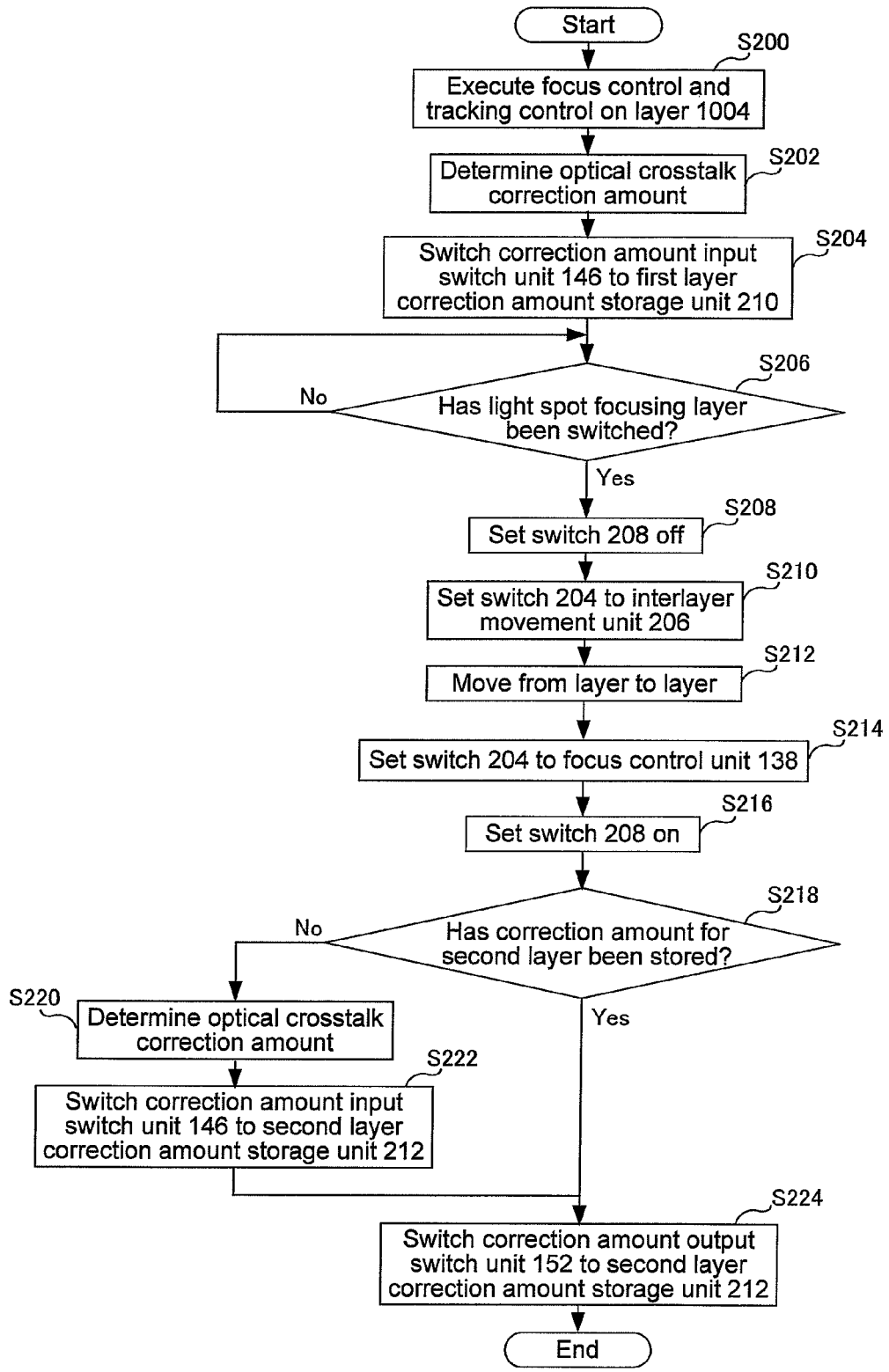
FIG. 10 is a flowchart showing processing performed in the second embodiment of the present invention.

The operation of the optical disc apparatus 200 according to the second embodiment with the above-described structure will now be described with reference to FIG. 10. FIG. 10 is a flowchart showing the operation of the optical disc apparatus 200 for switching the optical crosstalk correction amount according to a layer of the optical disc 102.

In the correction amount switch control, the optical disc apparatus 200 first executes focus control and tracking control on a predetermined track of the layer 1004 of the optical disc 102 (S200). The optical crosstalk correction amount calculation unit 124 of the optical disc apparatus 200 then determines the correction amount corresponding to the first layer (S202). The correction amount is input into the first layer correction amount storage unit 210 (S204).

When the output of the layer determination unit 202 switches from the layer 1004 to the layer 2006 (S206), the switch 208 is set off (S208) to stop input into the tracking control unit and set the tracking control off.

After the tracking control is set off, the switch 204 is switched to the interlayer movement unit 206 (S210) to move the light spot to the layer 2006 (S212). After the light spot is moved to the layer 2006, the switch 204 is switched to the focus control unit 138 (S214). The switch 208 is then set on (S216) to execute the tracking control (set the tracking control on).

After the tracking control is set on, the optical disc apparatus determines whether the second layer correction amount storage unit 212 stores the optical crosstalk correction amount corresponding to the layer 2006 (S218). When the second layer correction amount storage unit 212 does not store the optical crosstalk correction amount corresponding to the layer 2006, the optical crosstalk correction amount calculation unit 124 determines the correction amount corresponding to the second layer (S220). The determined correction amount is stored into the second layer correction amount storage unit 212 (S222).

The correction amount corresponding to the second layer stored in the second layer correction amount storage unit 212 is input into the multiplier 128 by switching the correction amount output switch unit 152 based on the output of the layer determination unit 202 (S224).

When the second layer correction amount storage unit 212 does not store the correction amount corresponding to the second layer, the correction amount may be set to zero or may be set to a predetermined value in the processing in steps S208 to S220.

When the second layer correction amount storage unit 212 stores the correction amount corresponding to the second layer, the correction amount output switch unit 152 may switch from the first layer correction amount storage unit 210 to the second layer correction amount storage unit 212 in any of steps S208 to S224.

Figure 11:
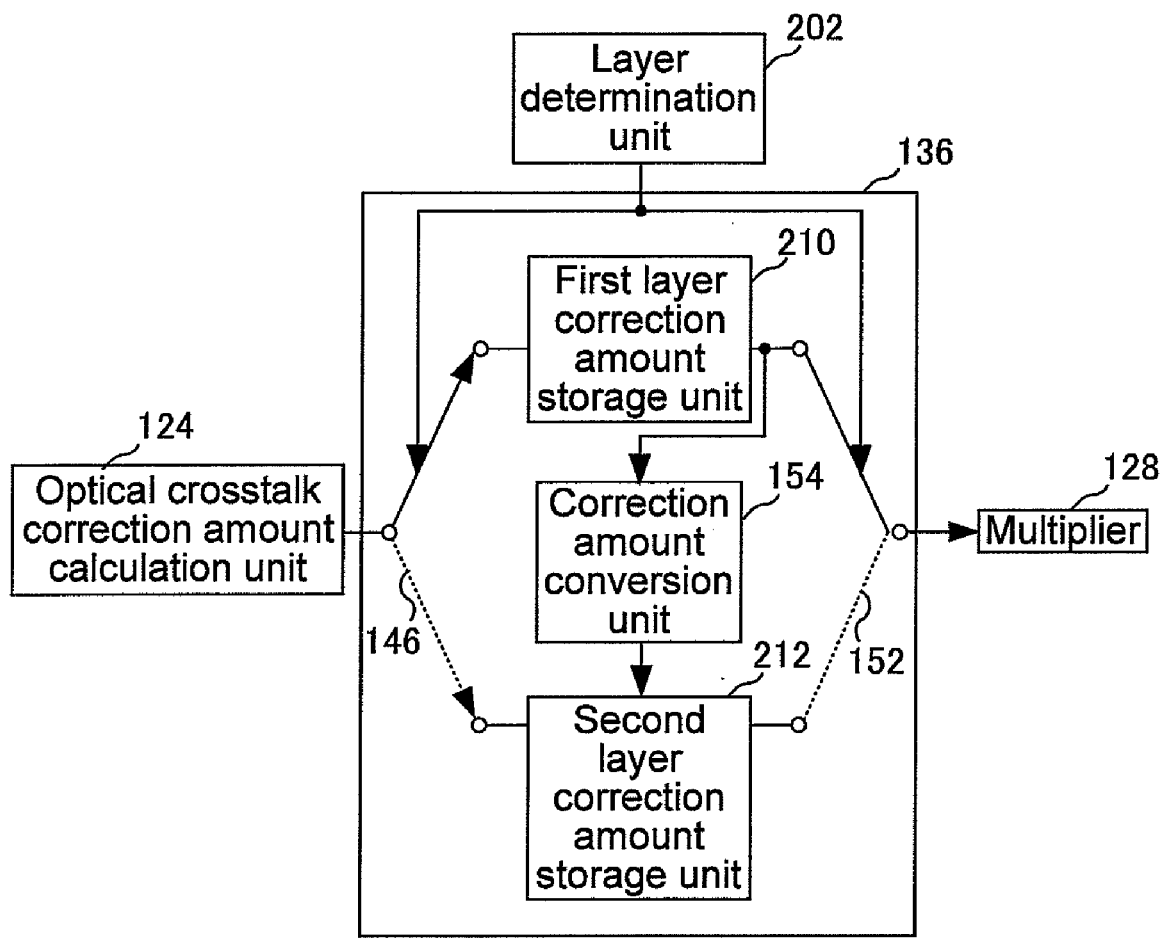
FIG. 11 shows an optical crosstalk correction amount setting unit 2 according to the second embodiment of the present invention.

The correction amount switch unit 136 may have the structure shown in FIG. 11. In FIG. 11, the components that are the same as in FIG. 9 are given the same reference numerals as in FIG. 9, and will not be described. The correction amount conversion unit 154 receives the correction amount corresponding to the first layer stored in the first layer correction amount storage unit 210, and converts the correction amount corresponding to the first layer to a correction amount corresponding to the second layer. The correction amount conversion unit 154 inputs the resulting correction amount into the second layer correction amount storage unit 212. The correction amount conversion unit 154 measures the modulation depths of the tracking error signals corresponding to the layers 1004 and 2006, and performs the correction amount conversion based on the modulation depths.

Figure 12:
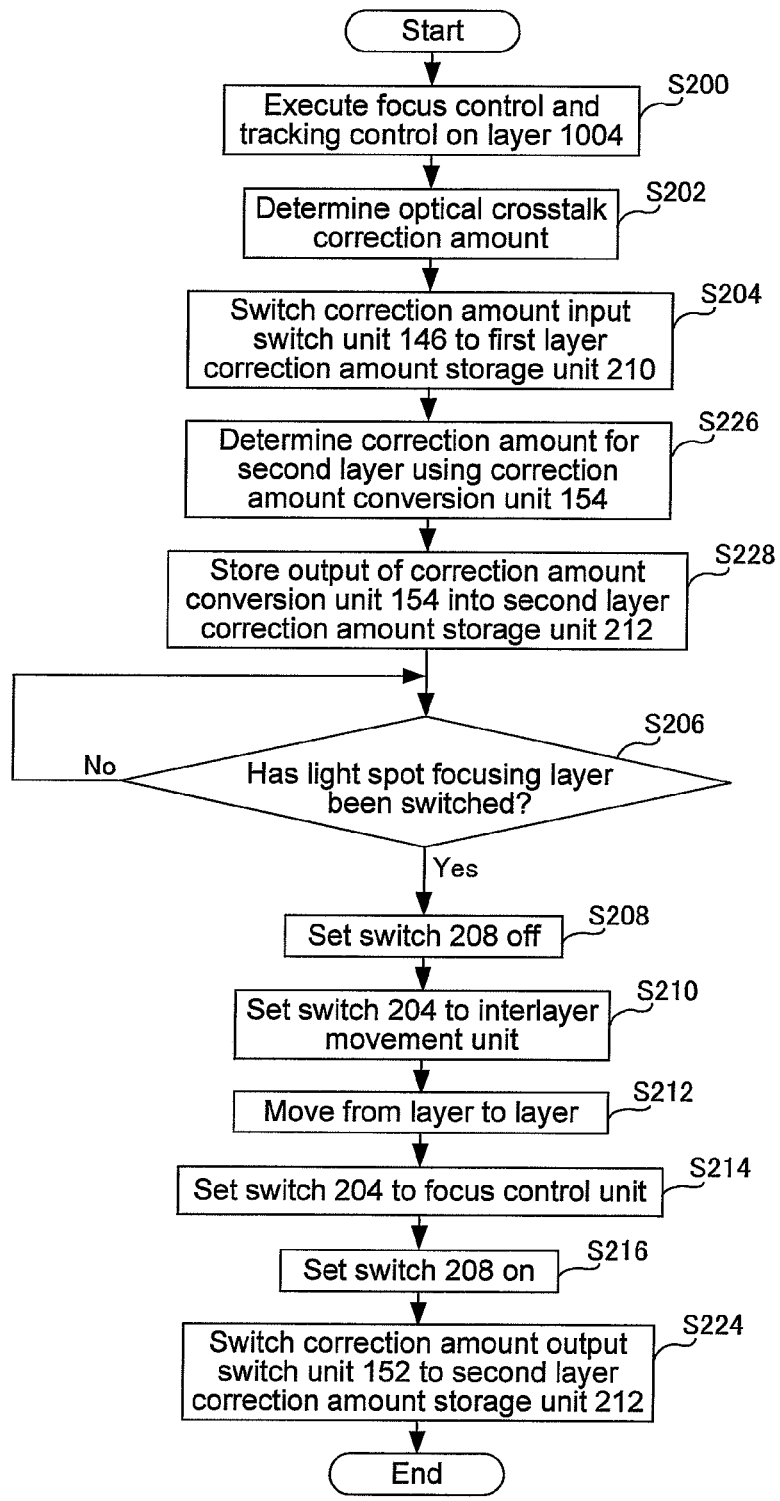
FIG. 12 is a flowchart showing processing performed in the second embodiment of the present invention.

The operation of the optical disc apparatus 200 that includes the correction amount switch unit 136 with the structure shown in FIG. 11 will now be described with reference to FIG. 12. The components that are the same as in FIG. 10 are given the same reference numerals as in FIG. 10, and will not be described.

When the first layer correction amount storage unit 210 has stored the correction amount in step S204, the correction amount conversion unit 154 determines the correction amount corresponding to the second layer (S226), and stores the determined correction amount corresponding to the second layer into the second layer correction amount storage unit 212 (S228).

When the correction amount corresponding to the second layer is determined before the correction amount corresponding to the first layer is determined, the correction amount conversion unit may convert the correction amount corresponding to the second layer to the correction amount corresponding to the first layer to determine the correction amount corresponding to the first layer.

When the optical disc apparatus 200 processes an optical disc with three or more layers, the optical disc apparatus 200 may include a unit for storing correction amounts corresponding to different layers.

In the optical disc apparatus 200 described above, the correction amount switch unit 136 switches the optical crosstalk correction amount according a layer to set a correction amount suitable for each layer and to reduce differences in optical crosstalk caused by different modulation depths of tracking error signals between layers. This structure reduces the TE signal component leaking into the FE signal output from the focus error detection unit 118, and consequently reduces the need to drive the vertical movement unit 140. As a result, the optical disc apparatus 200 reduces power consumption. This structure also reduces undesired effects of the minor loop R3003 shown in FIG. 30. As a result, the optical disc apparatus 200 improves focus control stability. When the optical disc apparatus 200 includes the correction amount switch unit 136, the optical crosstalk correction amount calculation unit 124 is simply required to calculate the correction amount for only one layer, and can calculate the correction amount for another layer based on the calculated correction amount. This shortens the time required to determine the correction amount for the other layer.

Third Embodiment

A third embodiment of the present invention will now be described.

Figure 13:
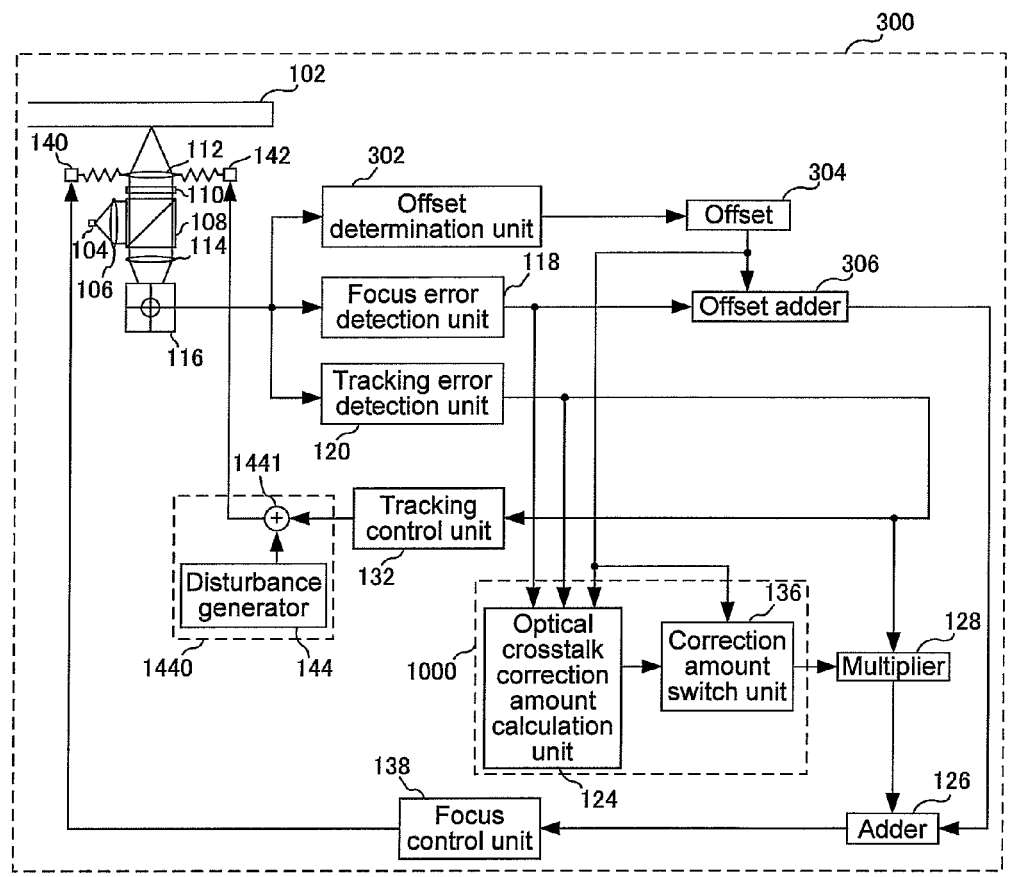
FIG. 13 shows an optical disc apparatus according to a third embodiment of the present invention.

FIG. 13 is a block diagram showing the structure of an optical disc apparatus 300 according to the third embodiment of the present invention. The components in the third embodiment that are the same as in the above embodiments are given the same reference numerals as in FIGS. 1 to 12, and will not be described.

In the optical disc apparatus 300 according to the third embodiment, an output of a light receiving element 116 is input into a focus error detection unit 118, a tracking error detection unit 120, and an offset determination unit 302. The offset determination unit 302 outputs an offset value. The output offset value is input into an offset adder 306, an optical crosstalk correction amount calculation unit 124, and a correction amount switch unit 136. The offset adder 306 adds an offset value to an output of the focus error detection unit 118, and inputs the resulting value to an adder 126. An output of the adder 126, which is obtained by adding an output of a multiplier 128 to an output of the offset adder 306, is input into a focus control unit 138.

The offset determination unit 302 determines an offset value that is added to the output of the focus error detection unit 118 in a manner that readout from the optical disc 102 or recording onto the optical disc 102 is performed with a predetermined quality. The predetermined quality is, for example, the quality with which a readout signal has a minimum jitter and an optimum modulation depth. The offset determination unit 302 may operate at predetermined time intervals or at predetermined temperature intervals.

Figure 14:
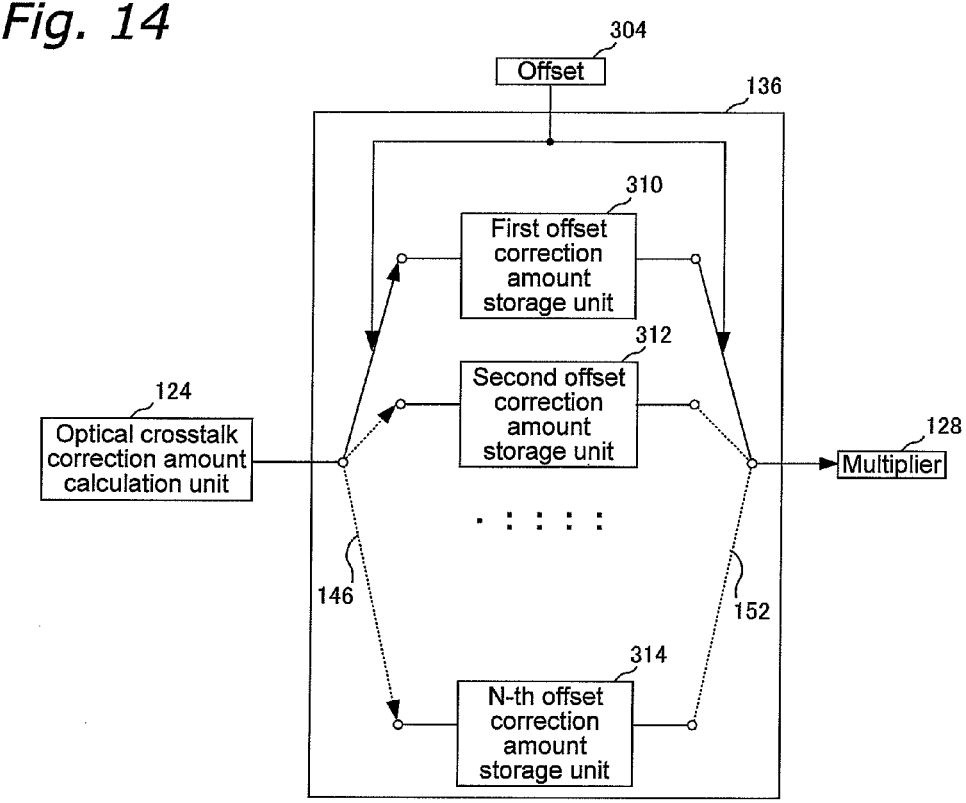
FIG. 14 shows an optical crosstalk correction amount setting unit 1 according to the third embodiment of the present invention.

As shown in FIG. 14, the correction amount switch unit 136 includes a correction amount input switch unit 146, a first offset correction amount storage unit 310, a second offset correction amount storage unit 312, . . . , an N-th offset correction amount storage unit 314, and a correction amount output switch unit 152. The first offset correction amount storage unit 310 stores a correction amount with which an offset value output from the offset determination unit 302 will be within a first predetermined range. The second offset correction amount storage unit 312 stores a correction amount with which the offset value will be within a second predetermined range. The N-th offset correction amount storage unit 314 stores a correction amount with which the offset value will be within an N-th range. The first to N-th predetermined ranges are different ranges of offset values that do not overlap one another.

Operation of the Optical Disc Apparatus

Figure 15:
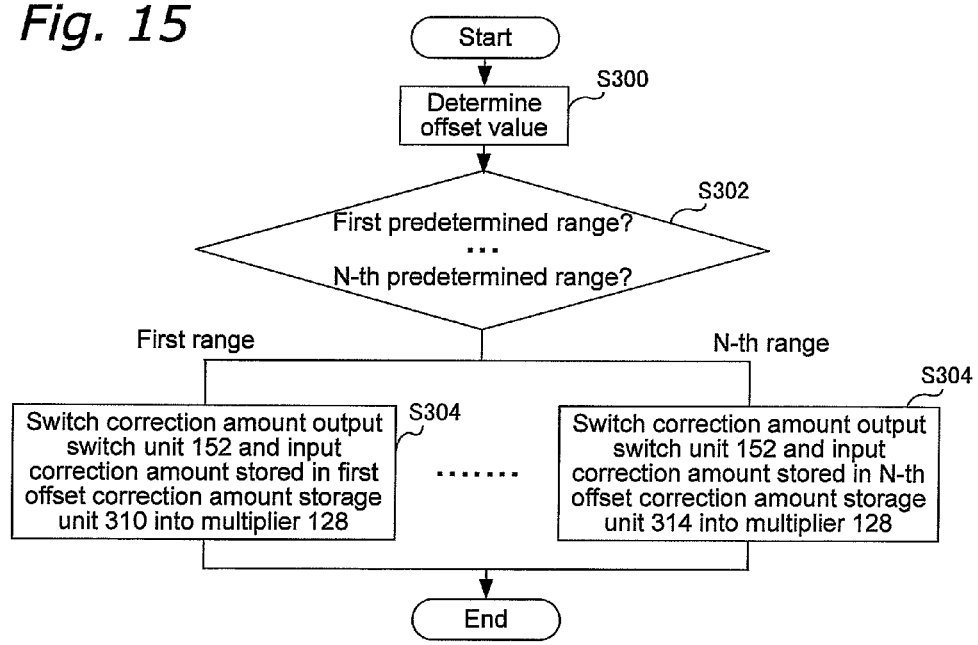
FIG. 15 is a flowchart showing processing performed in the third embodiment of the present invention.

The operation of the optical disc apparatus 300 with the above-described structure will now be described with reference to FIG. 15. FIG. 15 is a flowchart showing the operation of the optical disc apparatus 300 for switching the optical crosstalk correction amount based on an offset that is added to a focus error signal.

In the correction amount switch control, the offset determination unit 302 of the optical disc apparatus 300 first determines an offset value (S300). The optical disc apparatus 300 then determines which one of the first to N-th predetermined ranges includes the determined offset value (S302). Based on the determined range, the correction amount output switch unit 152 is switched to input the correction amount into the multiplier 128 (S304). The correction amount corresponding to each predetermined range may be set in advance, or may be determined based on the offset value corresponding to each predetermined range by the optical crosstalk correction amount calculation unit 124.

Figure 16:
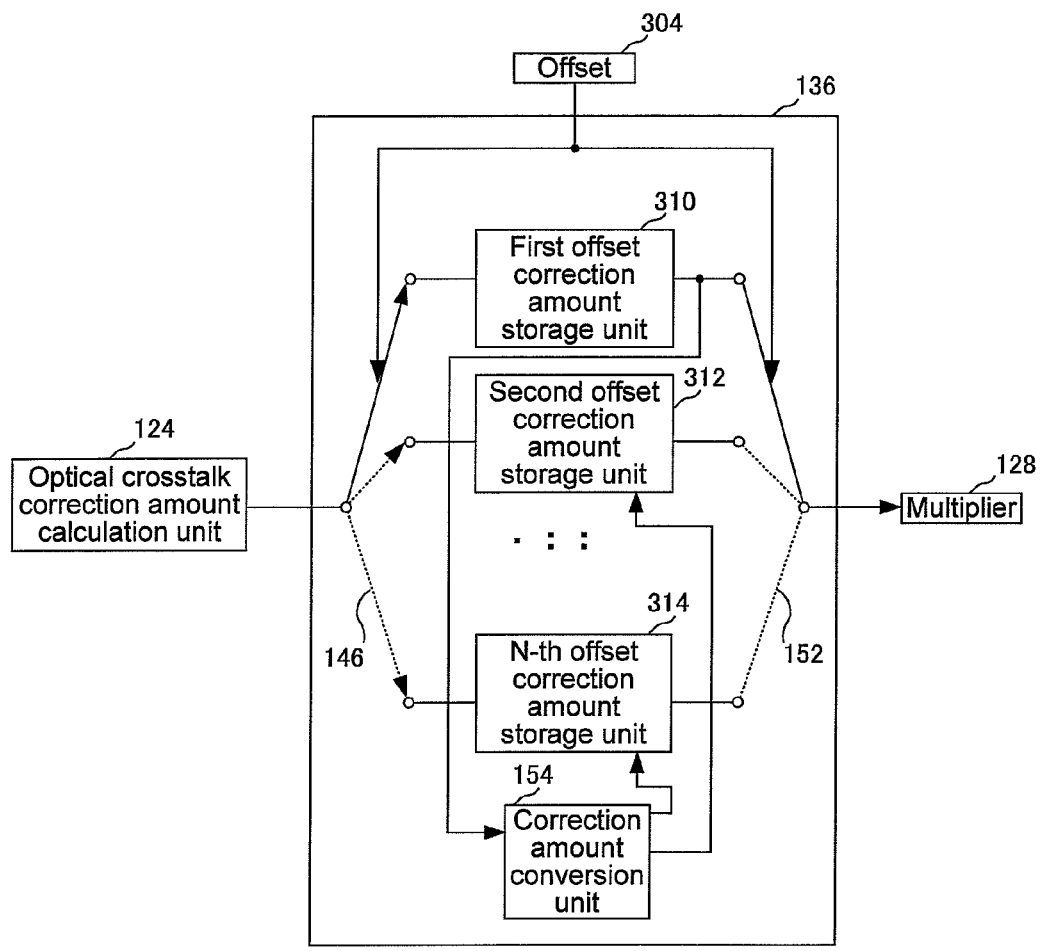
FIG. 16 shows an optical crosstalk correction amount setting unit 2 according to the third embodiment of the present invention.

The correction amount switch unit 136 may have the structure shown in FIG. 16. In FIG. 16, the components that are the same as in FIG. 14 are given the same reference numerals as in FIG. 14, and will not be described. The correction amount conversion unit 154 receives the correction amount corresponding to the first predetermined range stored in the first offset value correction amount storage unit 310, and converts the received correction amount to correction amounts to be stored in the second to N-th offset value correction amount storage units 312 to 314. The resulting correction amounts are input into the second to N-th offset value correction amount storage units 312 to 314. The correction amount conversion unit 154 measures the modulation depths of the tracking error signals corresponding to the first to N-th predetermined ranges, and performs the correction amount conversion based on the measured modulation depths.

The operation of the optical disc apparatus 300 that includes the correction amount switch unit 136 with the structure shown in FIG. 16 will now be described with reference to FIG. 17. The components that are the same as in FIG. 15 are given the same reference numerals as in FIG. 15, and will not be described.

The optical disc apparatus first determines the offset value (S306), and determines which one of the first to N-th predetermined ranges includes the determined offset value (S308). After the range is determined, the optical crosstalk correction amount calculation unit 124 determines the correction amount (S310), and inputs the determined correction amount into the correction amount storage unit corresponding to the range determined in step S310 among the first to N-th offset value correction amount storage units 310 to 314 (S312).

Based on the correction amount determined in step S310, the correction amount conversion unit 154 determines the correction amounts corresponding to the first to N-th predetermined ranges other than the predetermined range determined in step S310, and inputs the correction amounts determined by the correction amount conversion unit 154 into the correction amount storage units corresponding to the predetermined ranges (S314).

The input into the correction amount conversion unit 154 may be an output from at least one of the first to N-th offset value correction amount storage units 310 to 314. The correction amount conversion unit 154 may output the correction amounts corresponding to the correction amount storage units other than the input correction amount corresponding to one correction amount storage unit.

Figure 17:
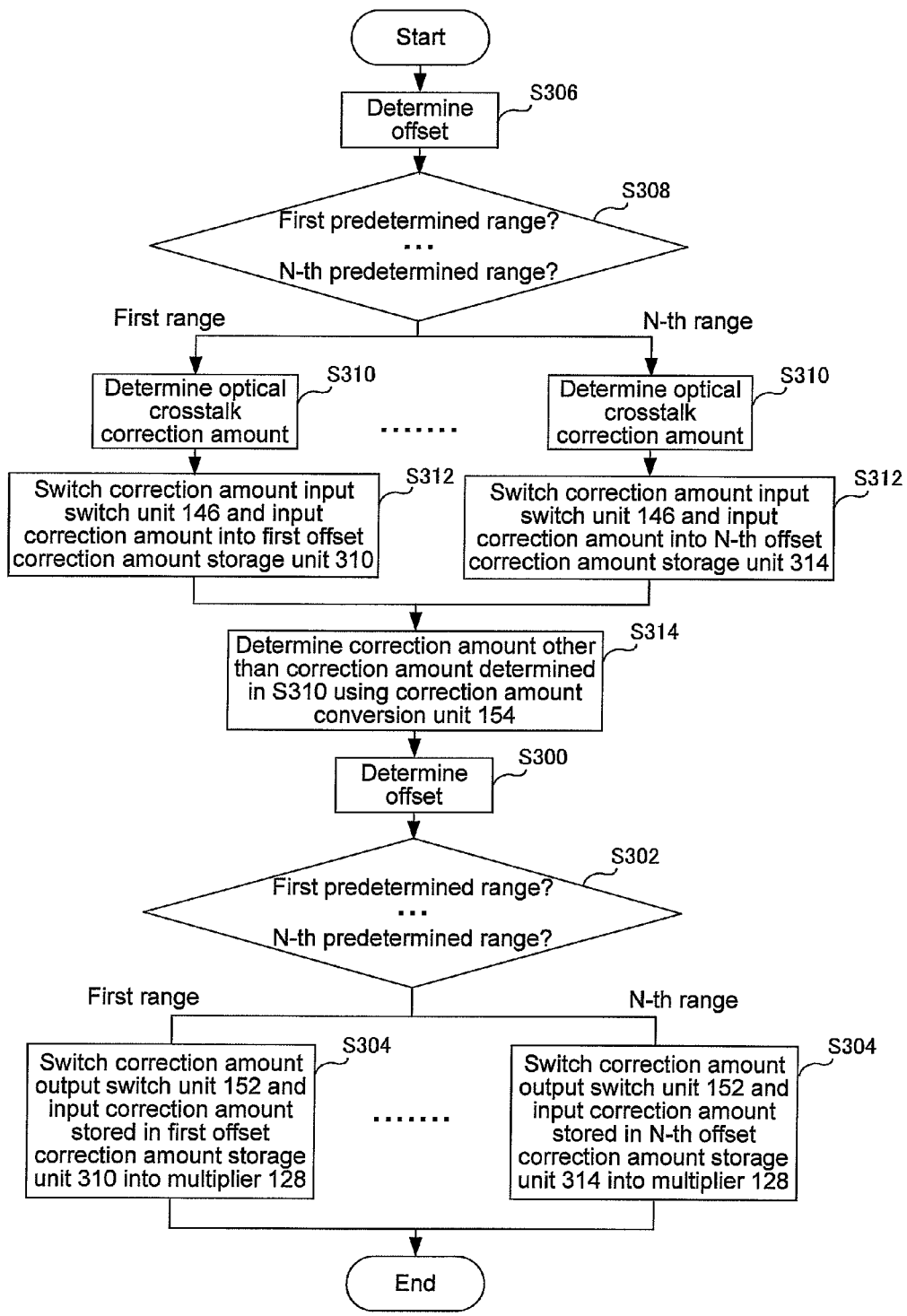
FIG. 17 is a flowchart showing processing performed in the third embodiment of the present invention.

The processing in step S310 in FIG. 17 may be performed between the processing in step S306 and the processing in step S308.

The offset value output from the offset determination unit may change. In this case, the optical disc apparatus may determine the offset amount corresponding to at least one of the first to N-th offset value correction amount storage units based on the changed offset value every time when the offset value changes.

In the optical disc apparatus 300 described above, the correction amount switch unit 136 switches the correction value of the optical crosstalk according to an offset value of a focus error signal to set a correction amount suitable for each offset value and to reduce differences in optical crosstalk caused by different modulation depths of tracking error signals between offset values. This structure reduces the TE signal component leaking into the FE signal output from the focus error detection unit 118, and reduces the need to drive the vertical movement unit 140. As a result, the optical disc apparatus 300 reduces power consumption. This structure also reduces undesired effects of the minor loop R3003 shown in FIG. 30 As a result, the optical disc apparatus 300 improves focus control stability. When the optical disc apparatus 300 includes the correction amount switch unit 136, the optical crosstalk correction amount calculation unit 124 is simply required to calculate the correction amount corresponding to one predetermined range of offset values, and can calculate the correction amounts corresponding to other predetermined ranges of offset values based on the calculated correction amount. This shortens the time required to determine the correction amounts corresponding to the other predetermined ranges.

Fourth Embodiment

Figure 18:
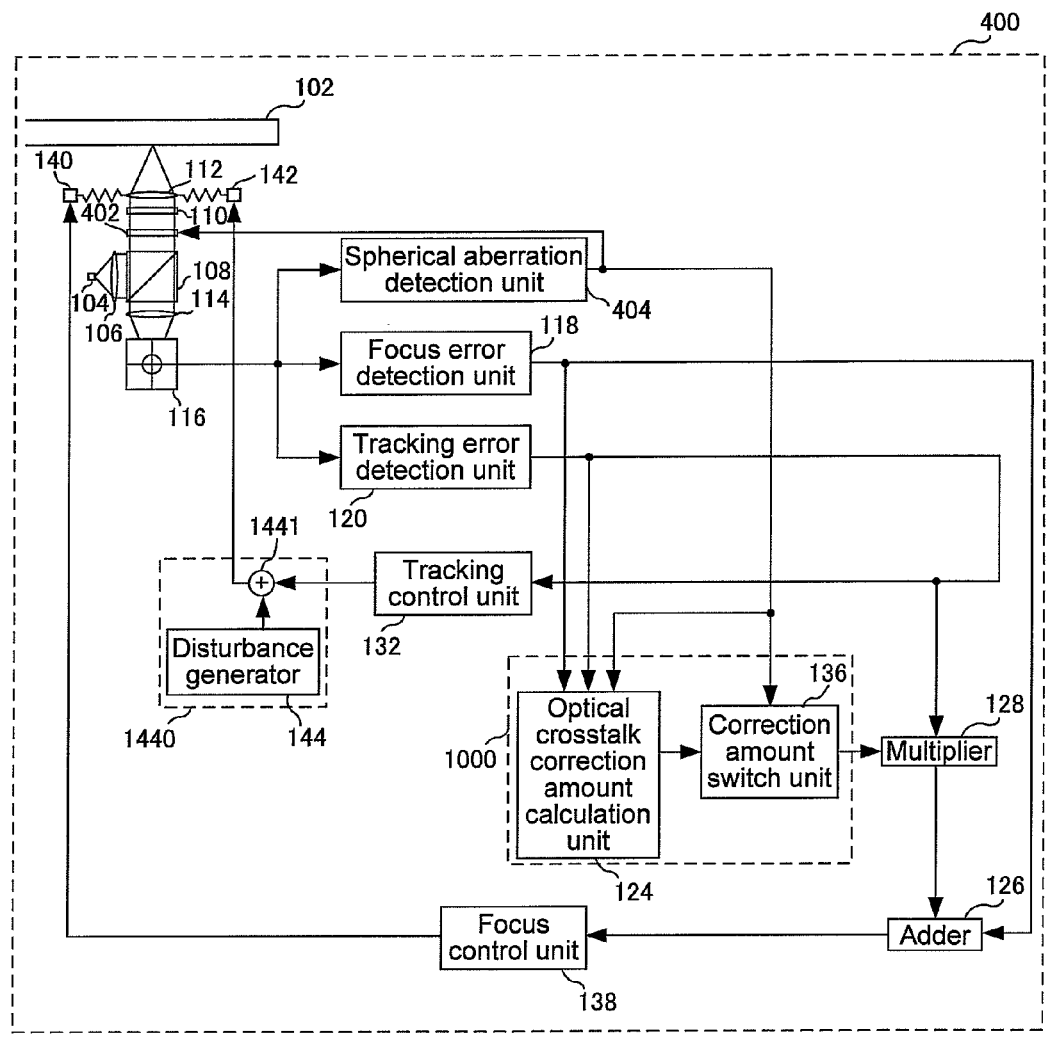
FIG. 18 shows an optical disc apparatus according to a fourth embodiment of the present invention.

A fourth embodiment of the present invention will now be described.
Structure of the Optical Disc Apparatus FIG. 18 is a block diagram showing the structure of an optical disc apparatus 400 according to the fourth embodiment of the present invention. The components in the fourth embodiment that are the same as in the above embodiments are given the same reference numerals as in FIGS. 1 to 17, and will not be described.

In the optical disc apparatus 400 according to the fourth embodiment, light reflected by a polarization beam splitter 108 passes through a spherical aberration correction unit 402 and is input into a polarization plate 110.

An output of the light receiving element 116 is input into a focus error detection unit 118, a tracking error detection unit 120, and a spherical aberration detection unit 404. An output of the spherical aberration detection unit 404 is input into the spherical aberration correction unit 402, an optical crosstalk correction amount calculation unit 124, and a correction amount switch unit 136.

The spherical aberration correction unit 402 is a light element that corrects a spherical aberration generated between an optical disc 102 and a light spot focused through a converging lens 112 based on an output of the spherical aberration detection unit 404. As one example, a collimating lens is used as the spherical aberration correction unit 402.

The spherical aberration detection unit 404 determines a spherical aberration correction amount in a manner that readout from the optical disc 102 or recording onto the optical disc 102 is performed with a predetermined quality. The predetermined quality is, for example, the quality with which a readout signal has a minimum jitter and an optimum modulation depth. The spherical aberration detection unit 404 may operate at predetermined time intervals or at predetermined temperature intervals.

Figure 19:
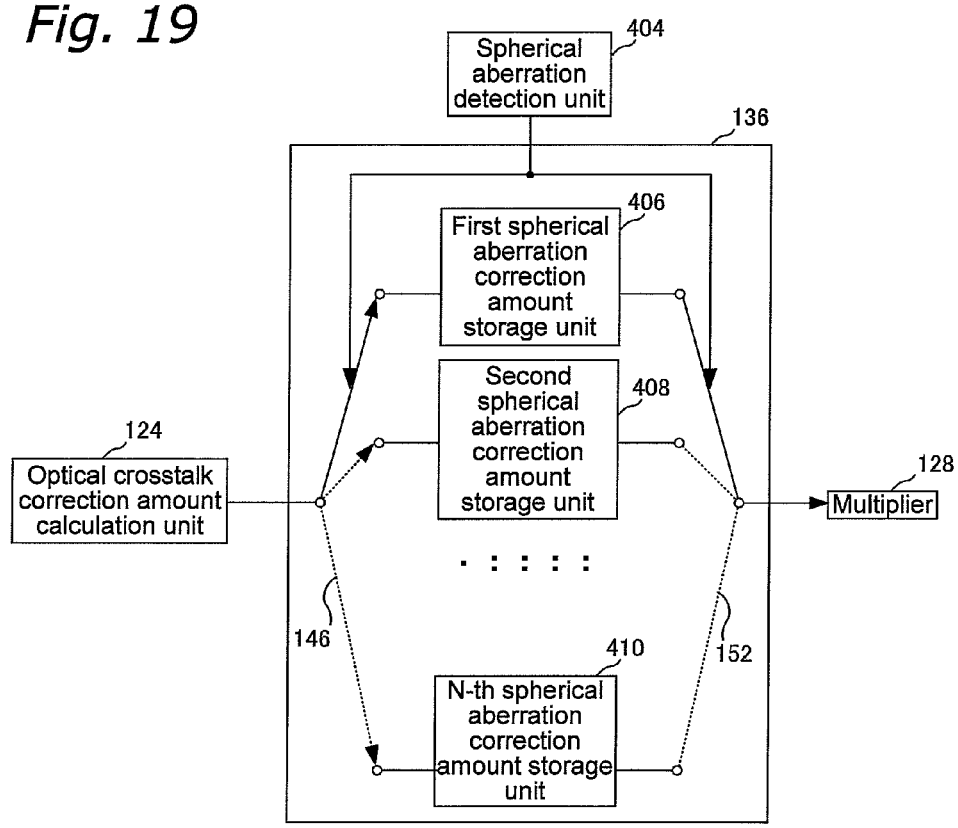
FIG. 19 shows an optical crosstalk correction amount setting unit 1 according to the fourth embodiment of the present invention.
Figure 20:
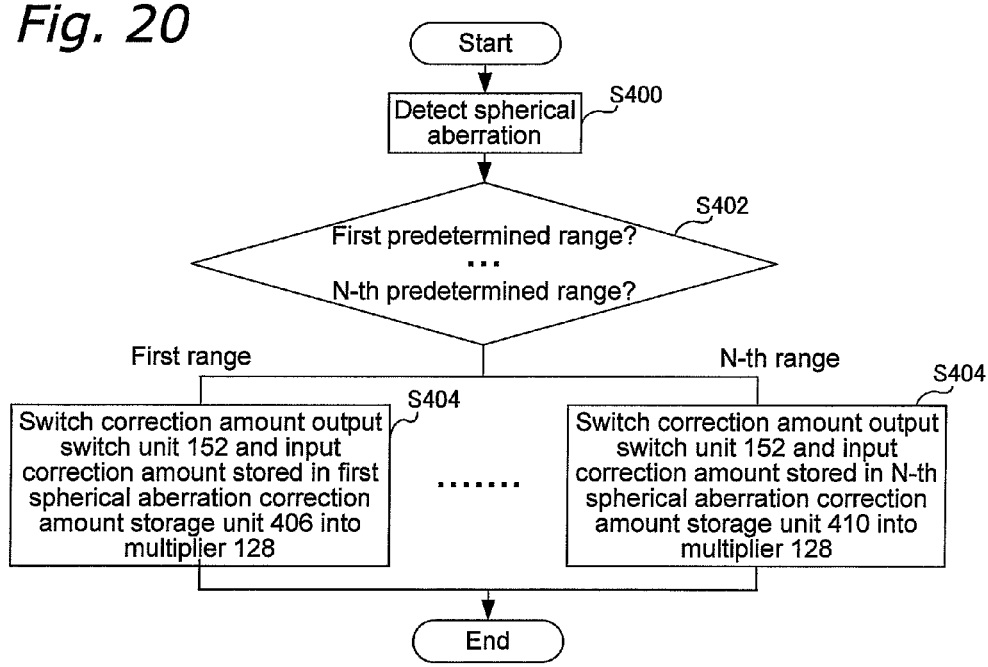
FIG. 20 is a flowchart showing processing performed in the fourth embodiment of the present invention.

As shown in FIG. 19, the correction amount switch unit 136 includes a correction amount input switch unit 146, a first spherical aberration correction amount storage unit 406, a second spherical aberration correction amount storage unit 408, an N-th spherical aberration correction amount storage unit 410, and a correction amount output switch unit 152. The first spherical aberration correction amount storage unit 406 stores and maintains a correction amount with which the spherical aberration will be within a first predetermined range. The second spherical aberration correction amount storage unit 408 stores and maintains a correction amount with which the spherical aberration will be within a second predetermined range. The N-th spherical aberration correction amount storage unit 410 stores and maintains a correction amount with which the spherical aberration will be within an N-th range. The first to N-th predetermined ranges are different ranges of spherical aberration values.
Operation of the Optical Disc Apparatus The operation of the optical disc apparatus 400 with the above-described structure will now be described with reference to FIG. 20. FIG. 20 is a flowchart showing the operation of the optical disc apparatus 400 for switching the optical crosstalk correction amount based on a spherical aberration.

In the correction amount switch control, the spherical aberration detection unit 404 of the optical disc apparatus 400 first determines a spherical aberration correction amount (S400). The optical disc apparatus 400 then determines which one of the first to N-th predetermined ranges includes the determined spherical aberration correction amount (S402). Based on the determined range, the correction amount output switch unit 152 is switched to input the correction amount output from the correction amount storage unit selected by the correction amount output switch unit 152 into the multiplier 128 (S404). The correction amount corresponding to each predetermined range may be set in advance, or may be determined based on the spherical aberration corresponding to each predetermined range by the optical crosstalk correction amount calculation unit 124.

Figure 21:
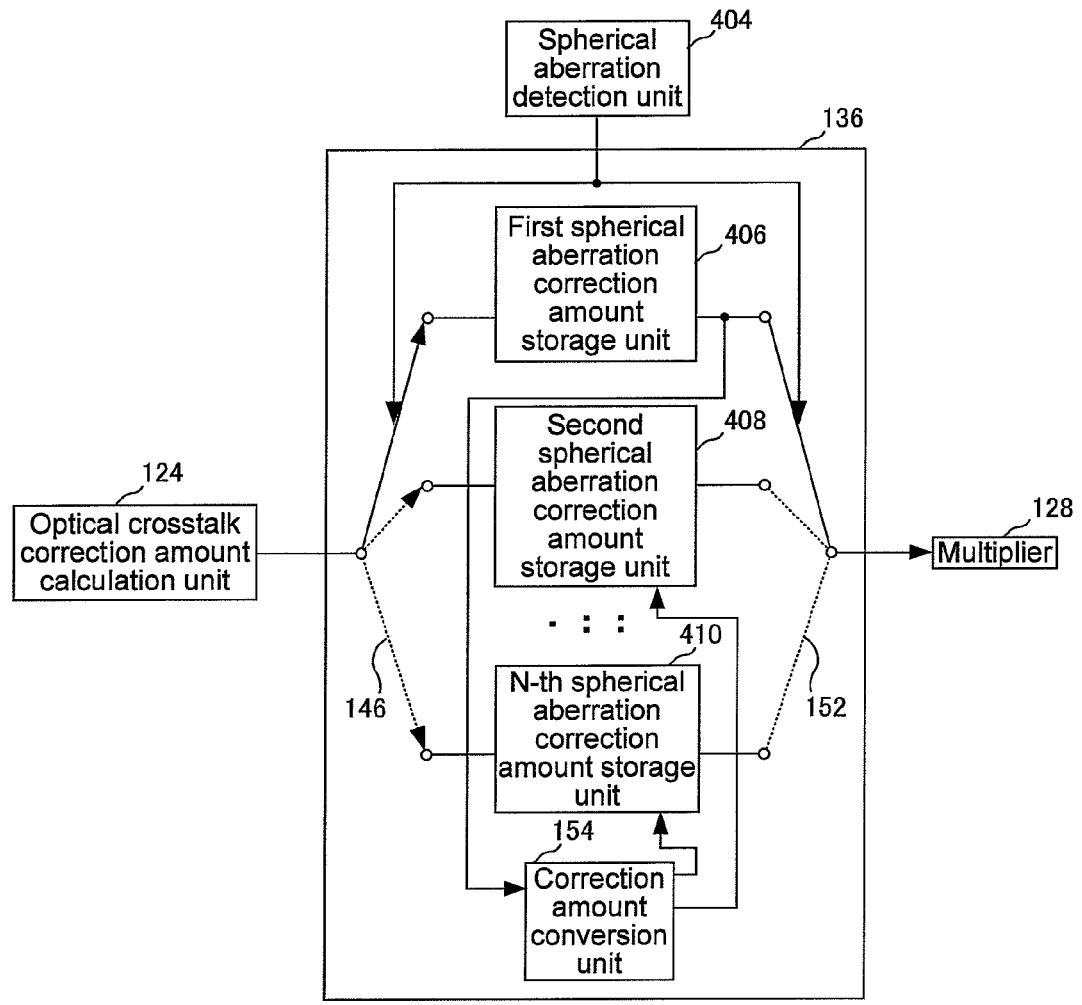
FIG. 21 shows an optical crosstalk correction amount setting unit 2 according to the fourth embodiment of the present invention.

The correction amount switch unit 136 may have the structure shown in FIG. 21. In FIG. 21, the components that are the same as in FIG. 19 are given the same reference numerals as in FIG. 19, and will not be described. The correction amount conversion unit 154 receives the correction amount corresponding to the first spherical aberration stored in the first spherical aberration correction amount storage unit 406, and converts the received correction amount to correction amounts to be stored in the second to N-th spherical aberration correction amount storage units 408 to 410. The resulting correction amounts are input into the second to N-th spherical aberration correction amount storage units 408 to 410. The correction amount conversion unit 154 measures the modulation depths of the tracking error signals corresponding to the first to N-th predetermined ranges, and performs the correction amount conversion based on the measured modulation depths.

The operation of the optical disc apparatus 400 that includes the correction amount switch unit 136 shown in FIG. 21 will now be described with reference to FIG. 22. The components that are the same as the components in FIG. 20 are given the same reference numerals as in FIG. 20, and will not be described.

The optical disc apparatus first determines the spherical aberration correction amount (S406), and determines which one of the first to N-th predetermined ranges includes the determined spherical aberration correction amount (S408). After the range is determined, the optical crosstalk correction amount calculation unit 124 determines the correction amount (S410), and inputs the determined correction amount into the correction amount storage unit corresponding to the range determined in step S410 among the first to N-th spherical aberration correction amount storage units 406 to 410 (S412).

Based on the correction amount determined in step S410, the correction amount conversion unit 154 determines the correction amounts corresponding to the first to N-th predetermined ranges other than the predetermined range determined in step S410, and inputs the correction amounts determined by the correction amount conversion unit 154 into the correction amount storage units corresponding to the predetermined ranges (S414).

The input into the correction amount conversion unit 154 may be an output from at least one of the first to N-th spherical aberration correction amount storage units 406 to 410. The correction amount conversion unit 154 may output the correction amounts corresponding to the correction amount storage units other than the input correction amount corresponding to one correction amount storage unit.

Figure 22:
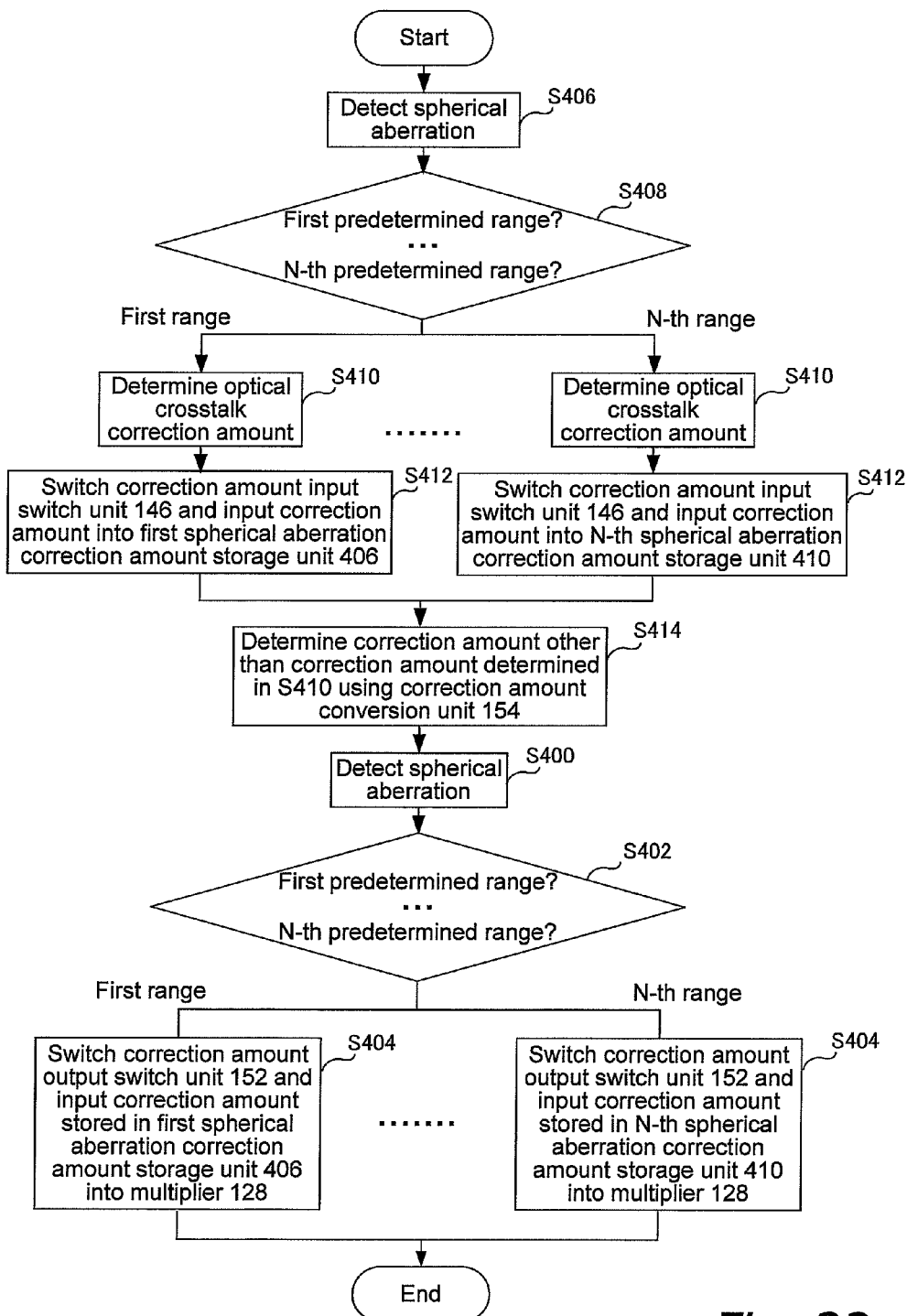
FIG. 22 is a flowchart showing processing performed in the fourth embodiment of the present invention.

The processing in step S410 in FIG. 22 may be performed between the processing in step S406 and the processing in step S408.

The spherical aberration may change. In this case, the optical disc apparatus may determine the spherical aberration corresponding to at least one of the first to N-th spherical aberration correction amounts based on the changed spherical aberration every time when the spherical aberration changes.

In the optical disc apparatus 400 described above, the correction amount switch unit 136 switches the correction value of the optical crosstalk according to a spherical aberration to set a correction amount suitable for each spherical aberration and to reduce differences in optical crosstalk caused by different modulation depths of tracking error signals between spherical aberrations. This structure reduces the TE signal component leaking into the FE signal output from the focus error detection unit 118, and consequently reduces the need to drive the vertical movement unit 140. As a result, the optical disc apparatus 400 reduces power consumption. This structure also reduces undesired effects of the minor loop R3003 shown in FIG. 30. As a result, the optical disc apparatus 400 improves focus control stability. When the optical disc apparatus 400 includes the correction amount switch unit 136, the optical crosstalk correction amount calculation unit 124 is simply required to calculate the correction amount corresponding to one predetermined range of spherical aberrations, and can calculate the correction amounts corresponding to other predetermined ranges of spherical aberrations based on the calculated correction amount. This shortens the time required to determine the correction amounts corresponding to the other predetermined ranges.

Fifth Embodiment

Figure 23:
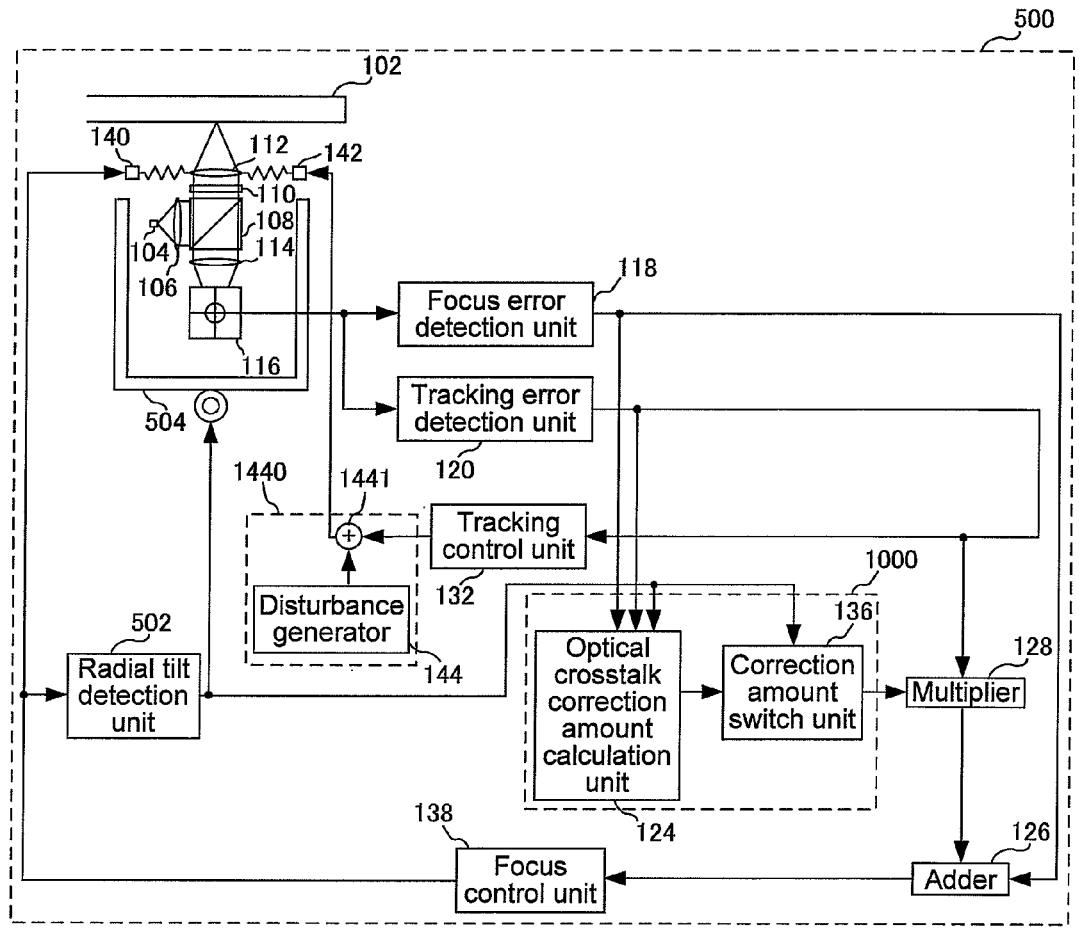
FIG. 23 shows an optical disc apparatus according to a fifth embodiment of the present invention.

A fifth embodiment of the present invention will now be described.
Structure of the Optical Disc Apparatus
FIG. 23 is a block diagram showing the structure of an optical disc apparatus 500 according to a fifth embodiment of the present invention. The components in the fifth embodiment that are the same as in the above embodiments are given the same reference numerals as in FIGS. 1 to 22, and will not be described.

In the optical disc apparatus 500 according to the fifth embodiment, an output of a focus control unit 138 is input into a vertical movement unit 140 and a radial tilt detection unit 502. An output of the radial tilt detection unit 502 is input into a radial tilt correction unit 504, an optical crosstalk correction amount calculation unit 124, and a correction amount switch unit 136 (hereafter the radial tilt may be referred to as the "R-tilt").

Figure 24A:
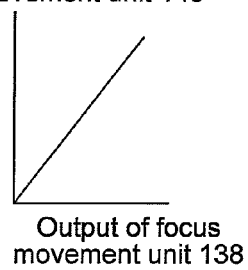
FIGS. 24A and 24B show a radial tilt detection unit in the fifth embodiment of the present invention.
Figure 24B:
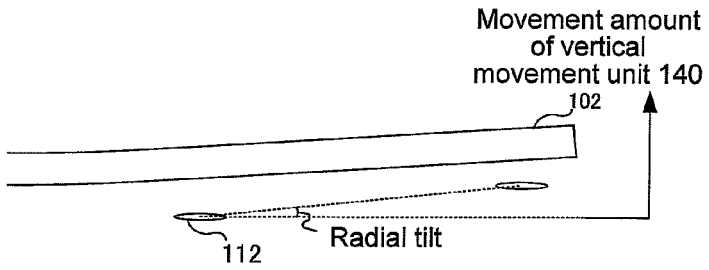

The radial tilt detection unit 502 detects a radial tilt amount generated in an optical disc 102. For example, the radial tilt detection performed when an output of the focus control unit 138 has a linear relationship with an amount by which the vertical movement unit 140 moves shown in FIG. 24A will be described. In this case, as shown in FIG. 24B, the radial tilt amount is calculated based on a difference between an output of the focus control unit 138 corresponding to a predetermined radial position of the optical disc 102 and an output of the focus control unit 138 at a radial position of the optical disc 102 corresponding to a position to which the converging lens 112 is moved from the predetermined radial position by a predetermined distance in the radial direction of the optical disc 102. The radial tilt detection unit 502 may operate at predetermined time intervals or at predetermined temperature intervals.

The radial tilt correction amount 504 corrects the radial tilt amount based on the radial tilt amount detected by the radial tilt detection unit 502. For example, the radial tilt correction unit 504 may correct the radial tilt amount by tilting the entire optical pickup, or by tilting a part of the optical pickup.

Figure 25:
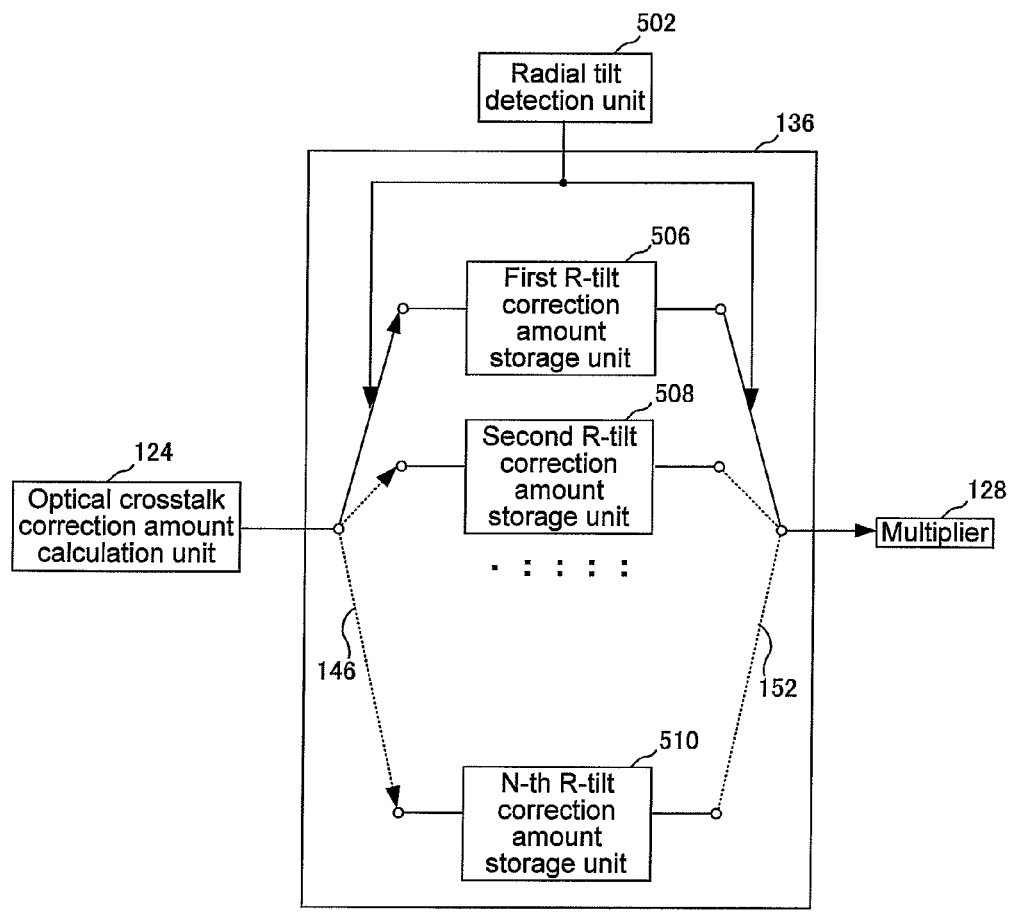
FIG. 25 shows an optical crosstalk correction amount setting unit 1 according to the fifth embodiment of the present invention.
Figure 26:
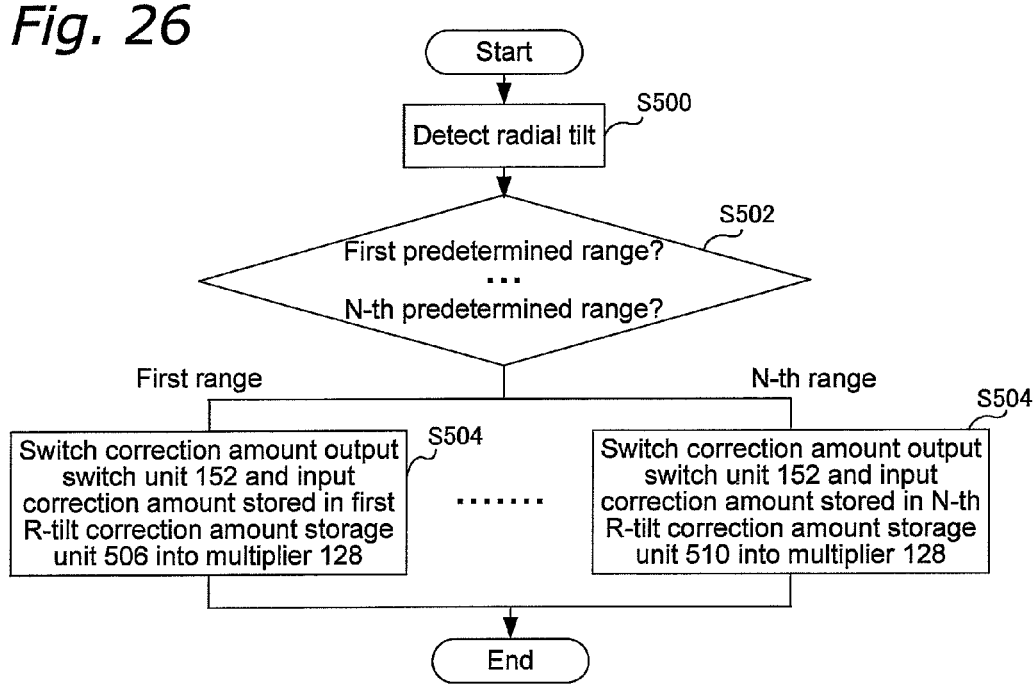
FIG. 26 is a flowchart showing processing performed in the fifth embodiment of the present invention.

As shown in FIG. 25, the correction amount switch unit 136 includes a correction amount input switch unit 146, a first R-tilt correction amount storage unit 506, a second R-tilt correction amount storage unit 508, ..., and an N-th R-tilt correction amount storage unit 510, and a correction amount output switch unit 152. The first R-tilt correction amount storage unit 506 stores and maintains a correction amount corresponding to a radial tilt in a first predetermined range. The second R-tilt correction amount storage unit 508 stores and maintains a correction amount corresponding to a radial tilt in a second predetermined range. The N-th R-tilt correction amount storage unit 510 stores and maintains a correction amount corresponding to a radial tilt in an N-th predetermined range. The first to N-th predetermined ranges are different ranges of radial tilt amounts.
Operation of the Optical Disc Apparatus The operation of the optical disc apparatus 500 with the above-described structure will now be described with reference to FIG. 26. FIG. 26 is a flowchart showing the operation of the optical disc apparatus 500 for switching the optical crosstalk correction amount based on a radial tilt amount.

In the correction amount switch control, the radial tilt detection unit 502 of the optical disc apparatus 500 first determines a radial tilt (S500). The optical disc apparatus 500 then determines which one of the first to N-th predetermined ranges includes the determined radial tilt (S502). Based on the determined range, the correction amount output switch unit 152 is switched to input the correction amount output from the correction amount storage unit that is selected by the correction amount output switch unit 152 into the multiplier 128 (S504). The correction amount corresponding to each predetermined range may be set in advance, or may be determined based on the radial tilt amount corresponding to each range by the optical crosstalk correction amount calculation unit 124.

Figure 27:
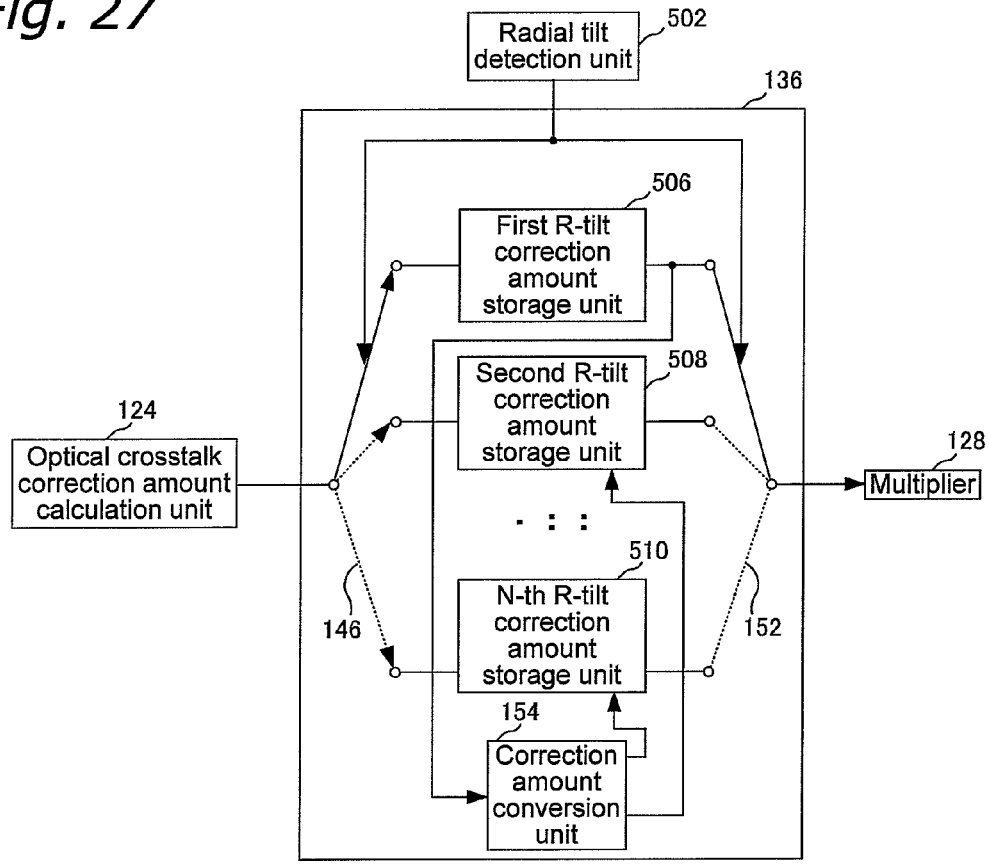
FIG. 27 shows an optical crosstalk correction amount setting unit 2 in the fifth embodiment of the present invention.

The correction amount switch unit 136 may have the structure shown in FIG. 27. In FIG. 27, the components that are the same as in FIG. 25 are given the same reference numerals as in FIG. 25, and will not be described. The correction amount conversion unit 154 receives the correction amount corresponding to the first radial tilt stored in the first R-tilt correction amount storage unit 506, and converts the received correction amount to correction amounts to be stored in the second to N-th R-tilt correction amount storage units 508 to 510. The resulting correction amounts are input into the second to N-th R-tilt correction amount storage units 508 to 510. The correction amount conversion unit 154 measures the modulation depths of the tracking error signals corresponding to the first to N-th predetermined ranges, and performs the correction amount conversion based on the modulation depths.

Figure 28:
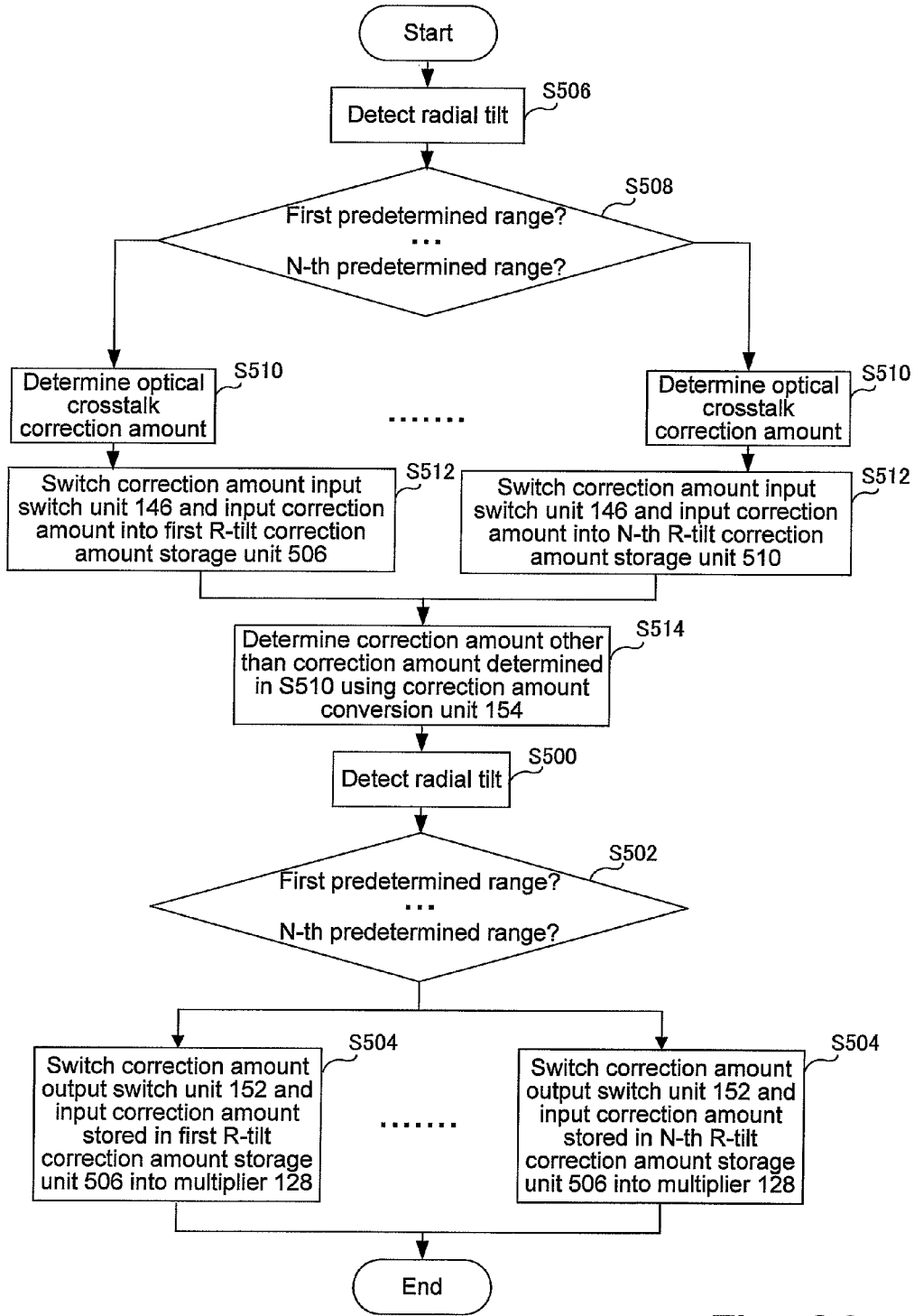
FIG. 28 is a flowchart 2 showing processing performed in the fifth embodiment of the present invention.
Figure 29:
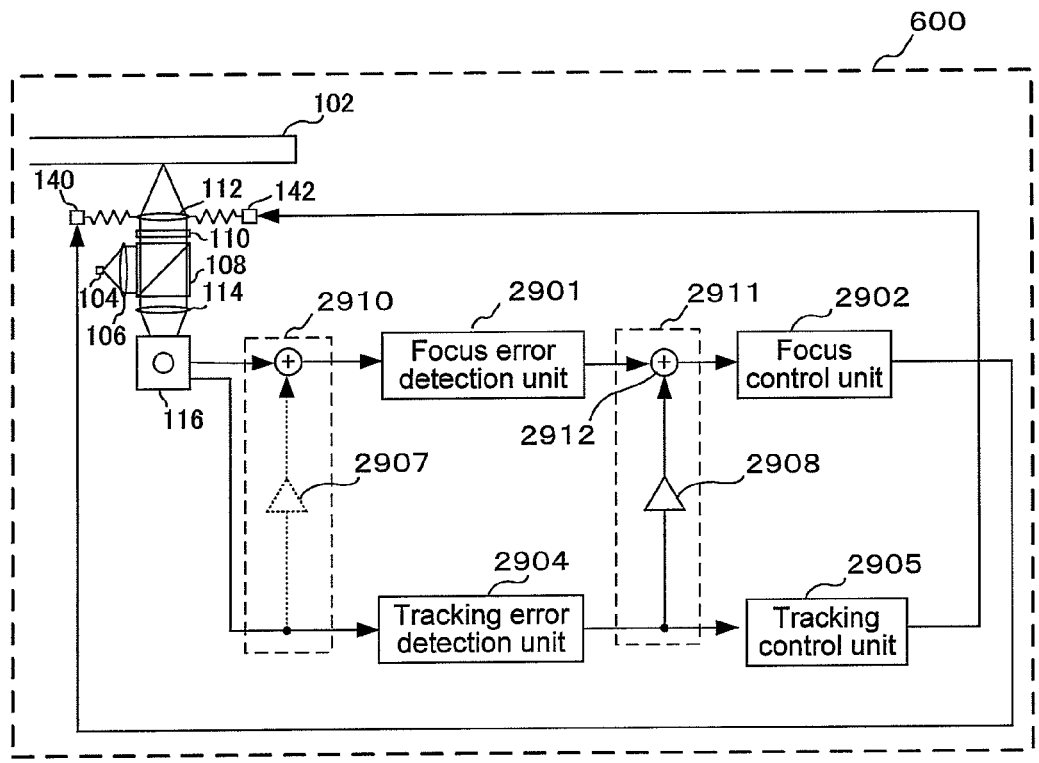
FIG. 29 shows an optical crosstalk correction unit included in a conventional optical disc apparatus.

The operation of the optical disc apparatus 500 that includes the correction amount switch unit 136 with the structure shown in FIG. 27 will now be described with reference to FIG. 28. The components that are the same as the components in FIG. 26 are given the same reference numerals as in FIG. 26, and will not be described.

The optical disc apparatus first determines the radial tilt amount (S506), and determines which one of the first to N-th predetermined ranges includes the determined radial tilt amount (S508). After the range is determined, the optical crosstalk correction amount calculation unit 124 determines the correction amount (S510), and inputs the determined correction amount into the correction amount storage unit corresponding to the range determined in step S510 among the first to N-th R-tilt correction amount storage units 506 to 510 (S512).

Based on the correction amount determined in step S510, the correction amount conversion unit 154 determines the correction amounts corresponding to the first to N-th predetermined ranges other than the predetermined range determined in step S510, and inputs the correction amounts determined by the correction amount conversion unit 154 into the correction amount storage units corresponding to the predetermined ranges (S514).

The processing in step S510 of FIG. 26 may be performed between the processing in S506 and the processing in S508.

The input into the correction amount conversion unit 154 may be an output from at least one of the first to N-th R-tilt correction amount storage units 506 to 510. The correction amount conversion unit 154 may output the correction amounts corresponding to the correction amount storage units other than the input correction amount corresponding to one correction amount storage unit.

The radial tilt may change. In this case, the optical disc apparatus may determine the correction amount corresponding to at least one of the first to N-th R-tilt correction amount storage units based on the changed radial tilt every time when the radial tilt changes.

In the optical disc apparatus 500 described above, the correction amount switch unit 136 switches the correction value of the optical crosstalk according to a radial tilt amount to set a correction amount suitable for each radial tilt amount and to reduce differences in optical crosstalk caused by different modulation depths of tracking error signals between radial tilt amounts. This structure reduces the TE signal component leaking into the FE signal output from the focus error detection unit 118, and consequently reduces the need to drive the vertical movement unit 140. As a result, the optical disc apparatus 500 reduces power consumption. This structure also reduces undesired effects of the minor loop R3003 shown in FIG. 30. As a result, the optical disc apparatus 500 improves focus control stability. When the optical disc apparatus 500 includes the correction amount switch unit 136, the optical crosstalk correction amount calculation unit 124 is simply required to calculate the correction amount corresponding to one predetermined range, and can calculate the correction amounts corresponding to other predetermined ranges based on the calculated correction amount. This shortens the time required to determine the correction amounts corresponding to the other predetermined ranges.

Other Embodiments

In the above embodiments, each block of the optical disc apparatus may be formed by a single chip with semiconductor device technology, such as LSI (large-scale integration), or some or all of the blocks of the optical disc apparatus may be formed by a single chip.

Although the semiconductor device technology is referred to as LSI above, the technology may be instead referred to as IC (integrated circuit), system LSI, super LSI, or ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

Further, if any circuit integration technology that can replace LSI emerges as an advancement of the semiconductor technology or as a derivative of the semiconductor technology, the technology may be used to integrate the functional blocks of the optical disc apparatus. Biotechnology is potentially applicable.

The processes described in the above embodiments may be realized using either hardware or software, or may be realized using both software and hardware.

The structures described in detail in the above embodiments are mere examples of the present invention, and may be changed and modified variously without departing from the scope and spirit of the invention.

INDUSTRIAL APPLICABILITY

The present invention is applicable to optical disc applied home appliances, such as DVD recorders or blu-ray recorders, which record and read digital audio and video information onto and from large-capacity optical discs, or to computer storage devices that use optical discs.

The invention claimed is:

1. An optical disc apparatus that records information onto and reads information from an optical disc having a track including a land and a groove, the apparatus comprising:

a focus error detection unit operable to detect a focus error signal based on reflection light from a spot of light focused on the optical disc and output the focus error signal;

a tracking error detection unit operable to detect a tracking error signal based on the reflection light and output the tracking error signal;

an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;

a multiplier operable to multiply an output of the tracking error detection unit by the correction amount determined by the optical crosstalk correction amount determination unit;

an adder operable to add an output of the focus error detection unit and an output of the multiplier;

a focus control unit operable to control focus of the spot based on an output of the adder; and a tracking control unit operable to execute tracking control based on an output of the tracking error detection unit;

wherein the optical crosstalk correction amount determination unit determines a rough correction amount of the correction amount used to correct the output of the tracking error detection unit based on an amplitude value of a signal component of the tracking error signal that leaks into the focus error signal when focus control of the spot is being executed and tracking control of the spot is not being executed, and determines a precise correction amount of the correction amount used to correct the output of the tracking error detection unit based on a signal component that leaks from the tracking error signal into the focus error signal when focus control of the spot is being executed and tracking control of the spot is being executed, the signal component with the same phase as the tracking error signal.

2. The optical disc apparatus according to claim 1, further comprising:
a disturbance addition unit operable to add a disturbance signal to an output of the tracking control unit,
wherein the disturbance addition unit adds a disturbance signal that has a frequency and an amplitude outside a band of the tracking control and the focus control when the tracking control is being executed, and
the optical crosstalk correction amount determination unit determines the precise correction amount of the correction amount used to correct the output of the tracking error detection unit based on the signal component of the tracking error signal that leaks into the focus error signal generated when the disturbance signal is added.

3. An optical disc apparatus that records information onto and reads information from an optical disc having a track including a land and a groove, the apparatus comprising:
a focus error detection unit operable to detect a focus error signal based on reflection light from a spot of light focused on the optical disc and output the focus error signal;
a tracking error detection unit operable to detect a tracking error signal based on the reflection light and output the tracking error signal;
an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;
a multiplier operable to multiply an output of the tracking error detection unit by the correction amount determined by the optical crosstalk correction amount determination unit;
an adder operable to add an output of the focus error detection unit and an output of the multiplier;
a focus control unit operable to control focus of the spot based on an output of the adder;
a tracking control unit operable to execute tracking control based on an output of the tracking error detection unit; and
a tracking polarity determination unit operable to determine which one of the land and the groove of the track is to be subjected to the tracking control,
wherein the optical crosstalk correction amount determination unit sets the correction amount based on an output of the tracking polarity determination unit.

4. The optical disc apparatus according to claim 3, wherein the optical crosstalk correction amount determination unit determines the correction amount based on at least one of the land and the groove.

5. The optical disc apparatus according to claim 3, wherein the optical crosstalk correction amount determination unit determines the correction amount corresponding to the groove based on the correction amount corresponding to the land.

6. The optical disc apparatus according to claim 3, wherein the optical crosstalk correction amount determination unit determines the correction amount corresponding to the land based on the correction amount corresponding to the groove.

7. An optical disc apparatus that records information onto and reads information from an optical disc having a track including a land and a groove, the apparatus comprising:
a focus error detection unit operable to detect a focus error signal based on reflection light from a spot of light focused on the optical disc and output the focus error signal;
a tracking error detection unit operable to detect a tracking error signal based on the reflection light and output the tracking error signal;
an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;
a multiplier operable to multiply an output of the tracking error detection unit by the correction amount determined by the optical crosstalk correction amount determination unit;
an adder operable to add an output of the focus error detection unit and an output of the multiplier;
a focus control unit operable to control focus of the spot based on an output of the adder; and
a tracking control unit operable to execute tracking control based on an output of the tracking error detection unit;
wherein
the optical disc has two or more recordable and readable layers,
the apparatus further comprising:
an interlayer movement unit operable to move the spot from one of the layers to another one of the layers; and
a layer determination unit operable to determine the layer on which the spot is focused,
wherein the optical crosstalk correction amount determination unit sets the correction amount based on an output of the layer determination unit.

8. The optical disc apparatus according to claim 7, wherein the optical crosstalk correction amount determination unit calculates the correction amount corresponding to each layer of the optical disc.

9. The optical disc apparatus according to claim 7, wherein the optical crosstalk correction amount determination unit uses the correction amount corresponding to the one of the layers to determine the correction amount of the other one of the layers.

10. An optical disc apparatus that records information onto and reads information from an optical disc having a track including a land and a groove, the apparatus comprising:
a focus error detection unit operable to detect a focus error signal based on reflection light from a spot of light focused on the optical disc and output the focus error signal;

a tracking error detection unit operable to detect a tracking error signal based on the reflection light and output the tracking error signal;

an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;

a multiplier operable to multiply an output of the tracking error detection unit by the correction amount determined by the optical crosstalk correction amount determination unit;

an adder operable to add an output of the focus error detection unit and an output of the multiplier;

a focus control unit operable to control focus of the spot based on an output of the adder;

a tracking control unit operable to execute tracking control based on an output of the tracking error detection unit;

an offset determination unit operable to determine an offset value that is added to an output of the focus error detection unit; and an offset adder operable to add the offset value determined by the offset determination unit to the output of the focus error detection unit, wherein the adder adds an output of the offset adder to an output of the multiplier, and the optical crosstalk correction amount determination unit sets the correction amount according to the offset value determined by the offset determination unit.

11. The optical disc apparatus according to claim 10, wherein the optical crosstalk correction amount determination unit uses the correction amount corresponding to one of a plurality of offset values determined by the offset determination unit to determine the correction amount corresponding to another one of the offset values.

12. The optical disc apparatus according to claim 10, wherein the optical crosstalk correction amount determination unit recalculates the correction amount corresponding to a case in which the offset value is B when the offset value changes from A to B.

13. An optical disc apparatus that records information onto and reads information from an optical disc having a track including a land and a groove, the apparatus comprising:

a focus error detection unit operable to detect a focus error signal based on reflection light from a spot of light focused on the optical disc and output the focus error signal;

a tracking error detection unit operable to detect a tracking error signal based on the reflection light and output the tracking error signal;

an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;

a multiplier operable to multiply an output of the tracking error detection unit by the correction amount determined by the optical crosstalk correction amount determination unit;

an adder operable to add an output of the focus error detection unit and an output of the multiplier;

a focus control unit operable to control focus of the spot based on an output of the adder;

a tracking control unit operable to execute tracking control based on an output of the tracking error detection unit;

a spherical aberration detection unit operable to detect a spherical aberration correction amount used to correct a spherical aberration generated at the spot on the disc; and a spherical aberration correction unit operable to correct the spherical aberration based on the spherical aberration correction amount detected by the spherical aberration detection unit, wherein the optical crosstalk correction amount determination unit sets the correction amount based on the spherical aberration correction amount detected by the spherical aberration detection unit.

14. The optical disc apparatus according to claim 13, wherein the optical crosstalk correction amount determination unit uses one of a plurality of spherical aberration correction amounts detected by the spherical aberration detection unit to determine another one of the spherical aberration correction amounts.

15. The optical disc apparatus according to claim 13, wherein the optical crosstalk correction amount determination unit recalculates the correction amount corresponding to a case in which the spherical aberration correction amount is B when the spherical aberration correction amount detected by the spherical aberration detection unit changes from A to B.

16. An optical disc apparatus that records information onto and reads information from an optical disc having a track including a land and a groove, the apparatus comprising:

a focus error detection unit operable to detect a focus error signal based on reflection light from a spot of light focused on the optical disc and output the focus error signal;

a tracking error detection unit operable to detect a tracking error signal based on the reflection light and output the tracking error signal;

an optical crosstalk correction amount determination unit operable to determine a correction amount used to correct an output of the tracking error detection unit based on a signal component, having the same phase as the tracking error signal, that leaks from the tracking error signal into the focus error signal occurring in reflection light from the optical disc when the spot crosses the track;

a multiplier operable to multiply an output of the tracking error detection unit by the correction amount determined by the optical crosstalk correction amount determination unit;

an adder operable to add an output of the focus error detection unit and an output of the multiplier;

a focus control unit operable to control focus of the spot based on an output of the adder;

a tracking control unit operable to execute tracking control based on an output of the tracking error detection unit;

a radial tilt detection unit operable to detect a radial tilt amount of the optical disc; and a radial tilt correction unit operable to correct the radial tilt amount based on the radial tilt amount determined by the radial tilt detection unit, wherein the optical crosstalk correction amount determination unit sets the correction amount according to the radial tilt amount detected by the radial tilt detection unit.

17. The optical disc apparatus according to claim 16, wherein
the optical crosstalk correction amount determination unit uses the correction amount corresponding to one of a plurality of radial tilt amounts detected by the radial tilt detection unit to determine the correction amount corresponding to another one of the radial tilt amounts.

18. The optical disc apparatus according to claim 16, wherein
the optical crosstalk correction amount determination unit determines the correction amount corresponding to a case in which the radial tilt amount is B when the radial tilt amount detected by the radial tilt detection unit changes from A to B.

19. A crosstalk correction method used in an optical disc apparatus that records and reads information onto and from an optical disc having a track including a land and a groove, the method comprising:
detecting a focus error signal based on reflection light from a spot of light focused on the optical disc and outputting the focus error signal;
detecting a tracking error signal based on the reflection light and outputting the tracking error signal;
determining a correction amount used to correct the outputted tracking error signal based on a differential value of a signal component, having the same phase as the tracking error signal, that leaks from the tracking error signal into the focus error signal occurring in reflection light from the optical disc when the spot crosses the track;
multiplying with a multiplier the outputted tracking error signal by the determined correction amount;
adding with an adder the focus error signal and an output of the multiplier;
controlling focus of the spot based on an output of the adder; and
executing tracking control based on the tracking error signal;
wherein the determining a correction amount includes determining a rough correction amount of the correction amount used to correct the output of the detecting of the tracking error signal based on an amplitude value of a signal component of the tracking error signal that leaks into the focus error signal when focus control of the spot is being executed and tracking control of the spot is not being executed, and determining a precise correction amount of the correction amount used to correct the output of the detecting of the tracking error signal based on a signal component that leaks from the tracking error signal into the focus error signal when focus control of the spot is being executed and tracking control of the spot is being executed, the signal component with the same phase as the tracking error signal.

20. A crosstalk correction method comprising:
setting a correction amount that is used to correct optical crosstalk from a tracking error signal to a focus error signal occurring in reflection light from an optical disc when a light spot crosses a track of the optical disc according to a spherical aberration generated at the light spot on the optical disc; and
multiplying a tracking error signal indicating a shift between the track and the light spot focused on the optical disc by the correction amount, and adding a result of the multiplication to a focus error signal indicating a converging state of the light spot onto the optical disc.

21. The crosstalk correction method according to claim 20, wherein
the correction amount corresponding to one of a plurality of spherical aberration correction amounts is used to determine the correction amount corresponding to another one of the spherical aberration correction amounts.

22. The crosstalk correction method according to claim 20, wherein
the correction amount corresponding to a case in which the spherical aberration correction amount is B is recalculated when the spherical aberration correction amount changes from A to B.

23. A crosstalk correction method comprising:
setting a correction amount that is used to correct optical crosstalk from a tracking error signal to a focus error signal occurring in reflection light from an optical disc when a light spot crosses a track of the optical disc according to a radial tilt correction amount used to correct a radial tilt amount generated at the light spot on the optical disc; and
multiplying a tracking error signal indicating a shift between the track and the light spot focused on the optical disc by the correction amount, and adding a result of the multiplication to a focus error signal indicating a converging state of the light spot onto the optical disc.

24. The crosstalk correction method according to claim 23, wherein
the correction amount corresponding to one of a plurality of radial tilt correction amounts is determined based on the correction amount corresponding to another one of the radial tilt correction amounts.

25. The crosstalk correction method according to claim 23, wherein
the correction amount corresponding to a case in which the radial tilt correction amount is B is recalculated when the radial tilt correction amount changes from A to B.

26. An integrated circuit used in an optical disc apparatus that records information onto and reads information from an optical disc having a track including a land and a groove, the integrated circuit comprising:
a focus error detection unit operable to detect a focus error signal based on reflection light from a spot of light focused on the optical disc and output the focus error signal;
a tracking error detection unit operable to detect a tracking error signal based on the reflection light and output the tracking error signal;
an optical crosstalk correction amount determination unit operable to determine a correction amount used to correct an output of the tracking error detection unit based on a differential value of a signal component, having the same phase as the tracking error signal, that leaks from the tracking error signal into the focus error signal occurring in reflection light from the optical disc when the spot crosses the track;
a multiplier operable to multiply an output of the tracking error detection unit by the correction amount determined by the optical crosstalk correction amount determination unit;
an adder operable to add an output of the focus error detection unit and an output of the multiplier;

a focus control unit operable to control focus of the spot based on an output of the adder; and a tracking control unit operable to execute tracking control based on an output of the tracking error detection unit;

wherein the optical crosstalk correction amount determination unit determines a rough correction amount of the correction amount used to correct the output of the tracking error detection unit based on an amplitude value of a signal component of the tracking error signal that leaks into the focus error signal when focus control of the spot is being executed and tracking control of the spot is not being executed, and determines a precise correction amount of the correction amount used to correct the output of the tracking error detection unit based on a signal component that leaks from the tracking error signal into the focus error signal when focus control of the spot is being executed and tracking control of the spot is being executed, the signal component with the same phase as the tracking error signal.

* * * * *